(12) United States Patent
Fraser et al.

(10) Patent No.: US 8,494,912 B2
(45) Date of Patent: Jul. 23, 2013

(54) METHOD OF WHOLESALE PRODUCT DISPLAY AND ORDERING

(75) Inventors: Alexander D. Fraser, Deland, FL (US); Maxwell M. Fraser, Deland, FL (US)

(73) Assignee: Repzio LLC, Deland, FL (US)

( * ) Notice: Subject to any disclaimer, the term of this patent is extended or adjusted under 35 U.S.C. 154(b) by 16 days.

(21) Appl. No.: 13/177,198

(22) Filed: Jul. 6, 2011

(65) Prior Publication Data
US 2012/0010935 A1 Jan. 12, 2012

Related U.S. Application Data

(60) Provisional application No. 61/362,348, filed on Jul. 8, 2010.

(51) Int. Cl.
*G06Q 30/00* (2012.01)
(52) U.S. Cl.
USPC ........................................... 705/26.1
(58) Field of Classification Search
USPC ....................... 705/26.1, 27.1, 27.2
See application file for complete search history.

(56) References Cited

U.S. PATENT DOCUMENTS

| | | | |
|---|---|---|---|
| 2002/0111877 A1* | 8/2002 | Nelson | 705/26 |
| 2002/0120529 A1* | 8/2002 | Buettgenbach et al. | 705/26 |
| 2005/0071186 A1* | 3/2005 | Manzo | 705/1 |
| 2007/0152041 A1* | 7/2007 | Hawkins | 235/383 |
| 2008/0214154 A1* | 9/2008 | Ramer et al. | 455/414.1 |
| 2010/0082455 A1* | 4/2010 | Rosenblatt et al. | 705/27 |
| 2011/0295713 A1* | 12/2011 | Ehrenberg et al. | 705/26.41 |

OTHER PUBLICATIONS

Hong Sheng, Strategic implications of mobile technology, The Journal of Strategic Information Systems, vol. 14, Issue 3, Sep. 2005, pp. 269-290.*

* cited by examiner

*Primary Examiner* — Matthew Zimmerman
(74) *Attorney, Agent, or Firm* — Caesar, Rivise, Bernstein, Cohen & Pokotilow, Ltd.

(57) ABSTRACT

A wholesale product ordering system is disclosed. The system comprises a remote server having an associated database of products of the at least one manufacturer and at least one portable access unit. The portable access unit has a video display and an associated keypad. The database of products includes images of the products and alphanumeric data (product identification numbers, prices, sizes, etc.) about the products. The portable access unit is used by a sales representative when visiting a potential customer (retail business) to access selected products of the database to display them and to enable direct ordering.

15 Claims, 36 Drawing Sheets

METHOD OF WHOLESALE PRODUCT DISPLAY AND ORDERING

CROSS-REFERENCE TO RELATED APPLICATIONS

This utility application claims the benefit under 35 U.S.C. §119(e) of Provisional Application Ser. No. 61/362,348, filed on Jul. 8, 2010, entitled Wholesale Product Display And Ordering System. The entire disclosure of that provisional application is specifically incorporated by reference herein.

STATEMENT REGARDING FEDERALLY SPONSORED RESEARCH OR DEVELOPMENT

"Not Applicable"

INCORPORATION-BY-REFERENCE OF MATERIAL SUBMITTED ON A COMPACT DISK

"Not Applicable"

FIELD OF THE INVENTION

The present invention relates generally to wholesale product ordering systems and, more particularly, to wireless ordering systems configured to facilitate transactions between a sales representatives and vendors of various products represented by such representatives.

BACKGROUND OF THE INVENTION

Sales representatives who call upon retail businesses to sell the goods of the manufacturers that they represent to such businesses typically have to bring printed materials and/or samples with them when they make a sales call to enable the retail businesses to pick the products desired. If the representative represents several manufacturers, or even one manufacturer who has hundreds or thousands of products, the task of providing the potential customer with those materials so that a selection of the desired product(s) can be made becomes very difficult and unwieldy.

A need thus exists for an automated system which can eliminate the need for sales representative to carry printed materials showing their various represented products to potential customers for order taking.

The subject invention addresses that need. To that end, the subject invention constitutes a wholesale product ordering system including at least one server on which is stored a database of information about numerous products and manufacturers. Each representative can have stored on that server information about each of the products of each of the manufacturers that he/she represents. To access the data of that database each representative carries a remote access device, e.g., an Apple® iPad, Windows® netbook, Android tablet, or any other hand-held device including a video screen so that he/she can download the entire application, along with the database, wirelessly via the Internet. Thus, once the application is on the remote access device when the representative visits a potential customer he/she can show the customer the various products available on the screen of the remote access device. Orders can then be taken and input into the system, via the keypad.

SUMMARY OF THE INVENTION

In accordance with one aspect of the invention there is provided a wholesale product ordering system for use by a sale representative representing at least one manufacturer or vendor of products for ultimate sale by a retail business. The system comprises a remote server having an associated database of products of the at least one manufacturer and at least one portable access unit. The portable access unit, e.g., an iPad or tablet, has a video display and an associated keypad (e.g., a touch screen which serves as the video display and the keyboard). The database of products is preselected by the sales representative and includes images (e.g., photographs of the products) and alphanumeric data (product identification numbers, prices, sizes, etc.) about the products in the database.

The portable access unit is arranged to be used by the sales representative when visiting a client or potential customer (a retail business) to access selected products of the database to display those products on the video display screen of the portable access device. This enables the prospective customer (the client) to examine those products. If it is desired to order any of those products, that can be accomplished directly by use of the portable access unit, e.g., the user entering alphanumeric data via the keypad and/or touching portions of the touch screen.

In accordance with one preferred aspect of this invention the portable access unit is arranged to be operated by a user to input his/her name and password, whereupon the display is populated with the list of the representative's clients and the manufacturer(s) or vendor(s) that the representative represents.

In accordance with another preferred aspect of this invention the system is arranged to enable the user to configure products through a series of drop down menus appearing on the display.

In accordance with another preferred aspect of this invention the system is arranged to provide preview order data on the screen so that the client can preview the order before the order is placed.

In accordance with another preferred aspect of this invention the system is arranged to provide a display of related products on the portable access unit's display when a particular product is selected.

In accordance with still another preferred aspect of this invention the system is arranged so that selected actuation of the portable access unit provides preview order data on the screen so that the client can preview the order before the order is placed.

In accordance with still another preferred aspect of this invention the system is arranged to provide a copy of an order placed using the system to a client via email from the portable access unit.

In accordance with still another preferred aspect of this invention the system is arranged to be used with a GPS system to automatically determine the identity of the client when the representative is at the location of the client.

In accordance with still another preferred aspect of this invention the system is arranged to be used with a wireless barcode scanner to enable bar coded items to be added directly to an order.

DESCRIPTION OF THE DRAWING

The following drawings disclose various embodiments of the present invention for purposes of illustration only and are not intended to limit the scope of the invention. For purposes of clarity, not every component may be labeled in every figure.

FIGS. 3-37 are illustrations, like that of FIG. 2, but showing different aspects of the use of the system.

DETAILED DESCRIPTION OF THE PREFERRED EMBODIMENT

Figure 1:
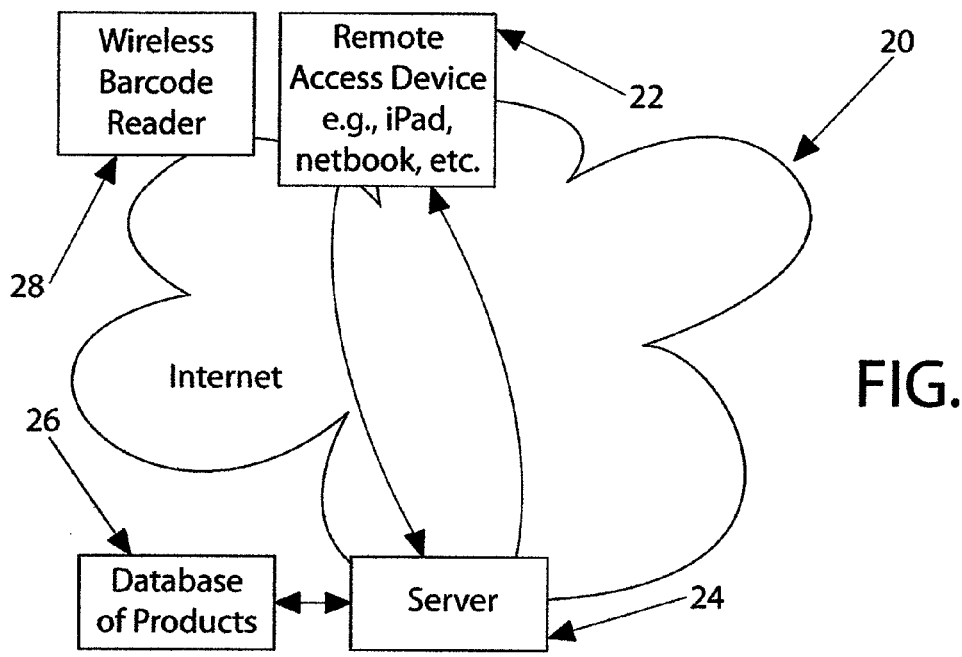
FIG. 1 is a schematic diagram of one exemplary remote ordering system constructed in accordance with this invention.

Referring now to the various figures of the drawing wherein like reference characters refer to like parts, there is shown at 20 in FIG. 1 a remote ordering system constructed in accordance with this invention. The system is arranged to be used by sales representatives who call on retail businesses to sell such businesses goods of the represented vendors/manufacturers for subsequent retail sales. The system 20 basically comprises a portable or hand-held access device 22, which is coupled wirelessly via the Internet to a central computer system, e.g., a server 24 having an associated database 26 of product information. In the exemplary embodiment shown the access device is in the form of an Apple® iPad, but could be any other suitable device, e.g., an Android tablet, a Windows® netbook or netpad, a webbook, etc., which is carried by the sales representative when he/she visits a retail business (the client) to sell the business products from the various manufacturers/vendors that he/she represents. In the preferred embodiment shown herein all of the software of the system is in the form of a native application arranged to be downloaded to the device 22 from the server 24. In particular, the entire database is hosted by the server and downloaded entirely by the device 22. Thus, it is not necessary to have Internet access for the system to function once it has been downloaded onto the device. However, it is contemplated that the system can be arranged so that the database is not downloaded entirely onto the device from the server. In such a case Internet access would be required for operation of the system. In either case, the server 24 can be of any suitable construction for the task at hand. The data contained in the database consists of product information for various manufacturers or vendors, e.g., furniture manufacturers, lamp manufacturers, artwork manufacturers, etc.

It should be pointed out that the database of manufacturers is not limited to any particular product line(s), e.g., home furnishings, and can thus be for any types of products typically sold at wholesale by sales representatives calling on retail businesses.

The system 20 is arranged to be operated by a service provider. Access to the system is accomplished via the Internet by any sales representative who is a registered user of the system. To that end, each sales representative registers with the service provider to be a user of the system. Once registered data for that representative can then be uploaded to the system for storage in the database. Examples of the data that is kept on the system for each sales representative are the product data (e.g., model numbers, pricing, size, color, availability, etc.) for each of the product lines/manufacturers represented by that representative.

Figure 2:
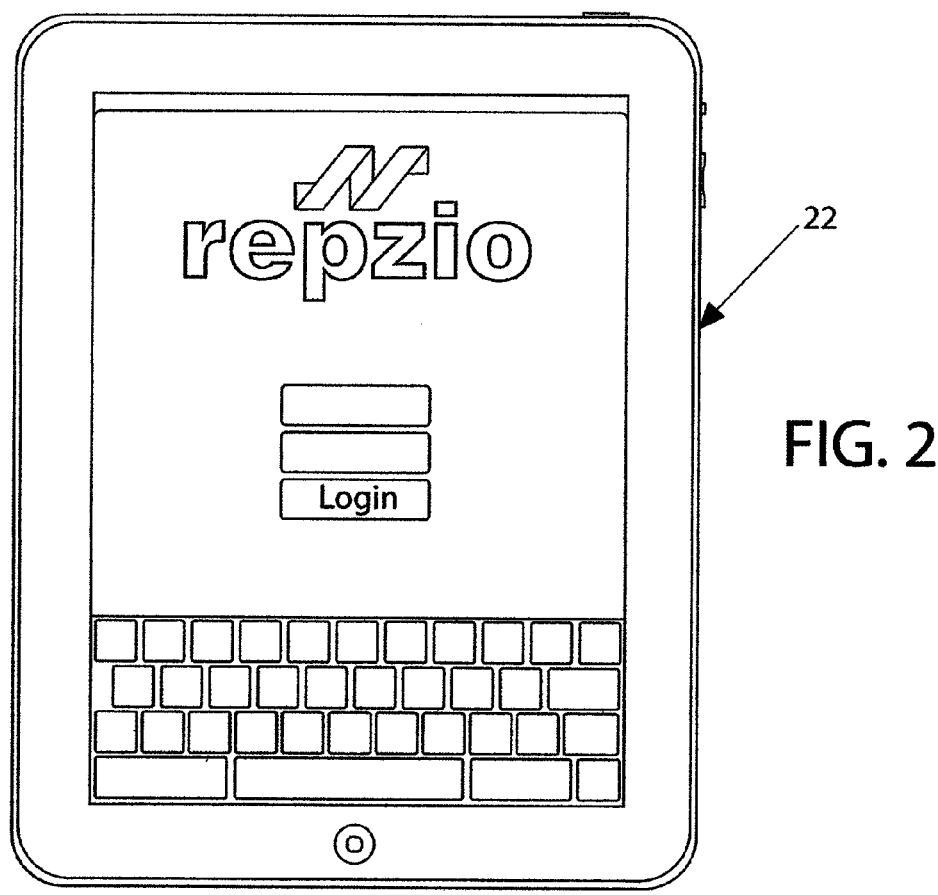
FIG. 2 is an illustration of one exemplary type of hand-held or portable device, e.g., an Apple® iPad, for providing access to the system shown during an initial stage in the use of the system.
Figure 3:
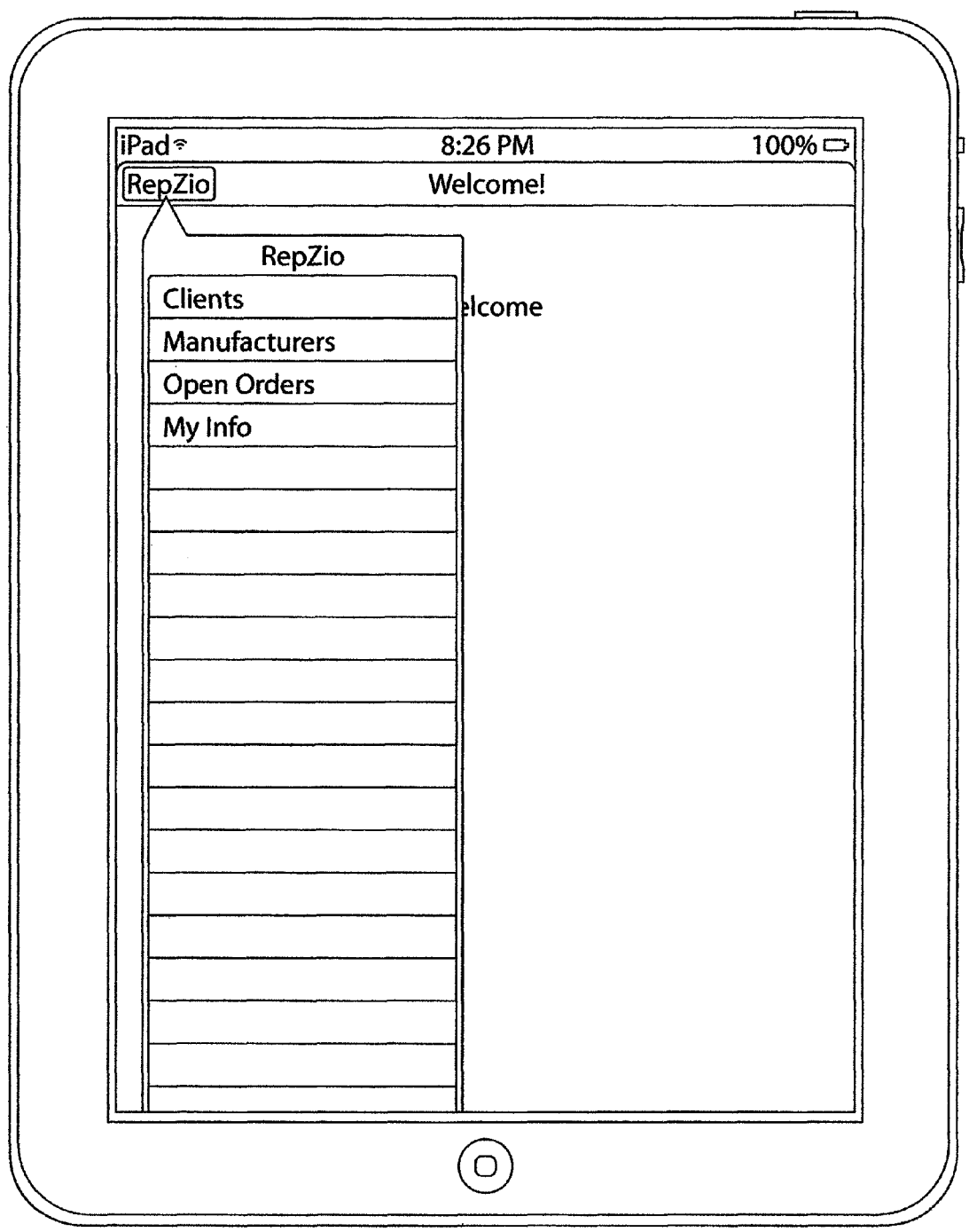

To use the system 20, the sales representative accesses the website of the provider of the wholesale ordering service via his/her iPad 22. In this case, the exemplary website for the service is designated as "RepZio". When at that website, the user has to log on to access his/her data. To that end, the first screen presented to the user upon accessing the website is the log in screen shown in FIG. 2. At this screen the user inputs his/her name and password via the keypad appearing on the iPad's touch screen. Based on that input the server of the system 20 sends data back to the iPad 22 to populate the screen of the iPad as shown in FIG. 3 with the list of the representative's clients (e.g., the retail businesses) and all of the manufacturers/vendor that he/she represents as well as any open orders, parts orders or client notes. In the exemplary figures of the drawing of this application the products are lamps, lighting products and artwork, e.g., frames. Those products are merely some of a myriad of products for which the subject invention can be used.

Figure 4:
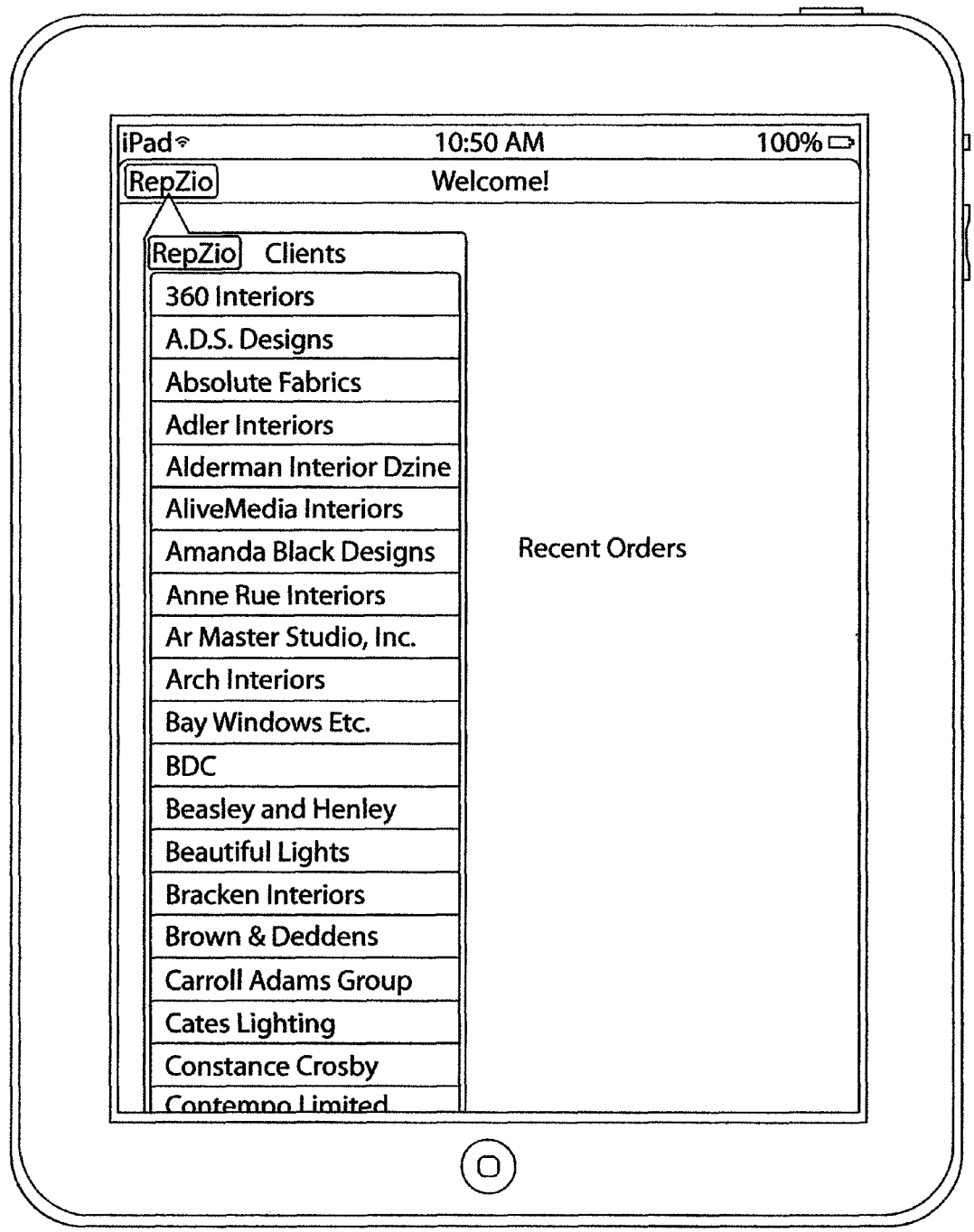

When the user (the sales representative) inputs his/her log in and password into the system, that user's particular client database is presented to him/her on the iPad screen. In fact, that client list will be populated by the system 20 based on the geographic location of the iPad as sensed by the GPS tracking feature of the iPad. Thus, if the representative is at store XYZ, that client (the retailer) will be at the top of the client list. In FIG. 4 there is shown an exemplary client list. The sales representative can then select the desired client and the manufacturer of the products, e.g., lighting products, that he/she wants to show to the retailer. Additionally, if a manufacturer has a tiered pricing structure the correct wholesale price will automatically populate the screen.

Figure 5:
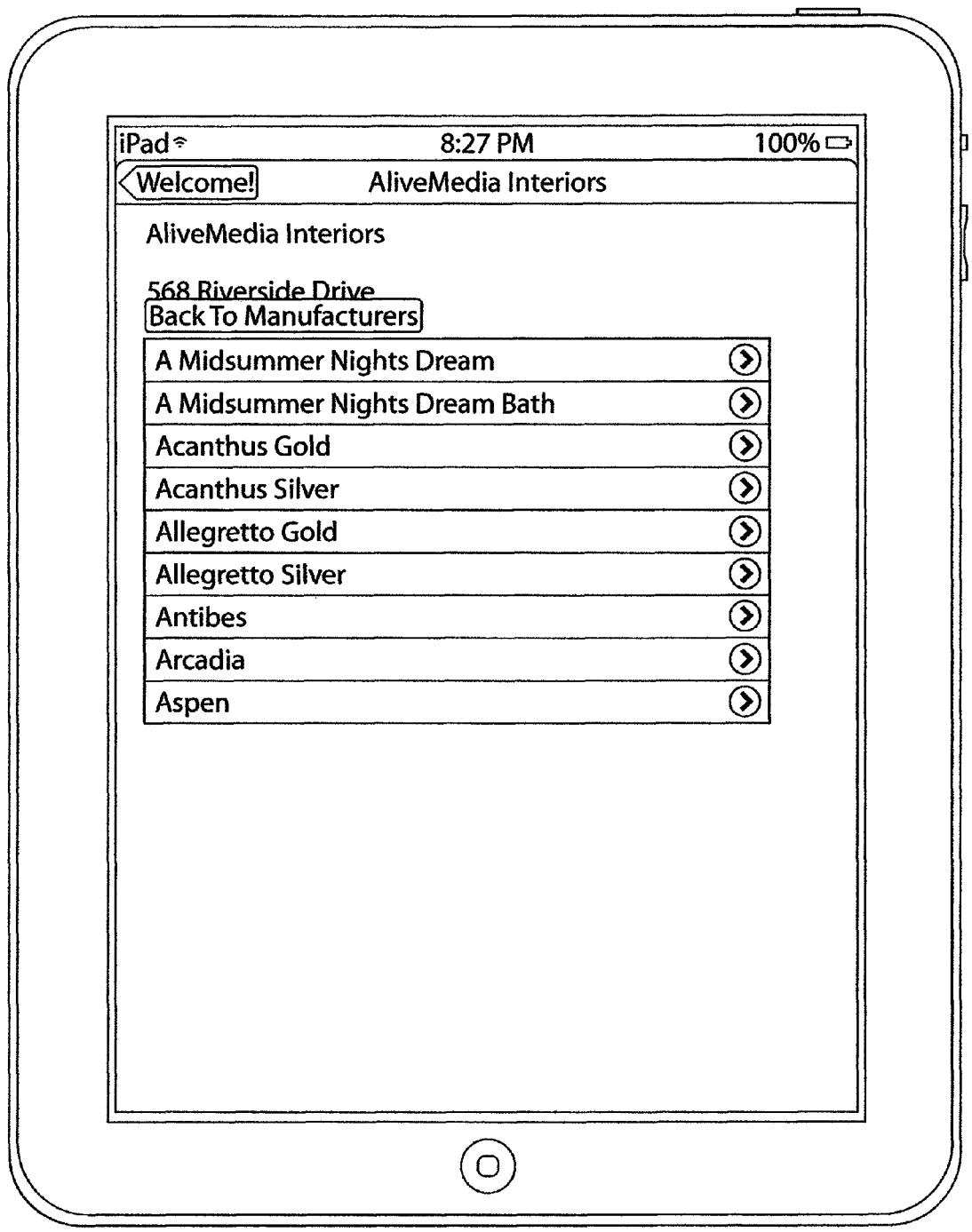

Once a sales representative selects the client and the manufacturer the sales representative has the option to either select products predetermined by each specific predetermined database or by typing in "tags" at the top of the screen. Examples of different predetermined databases are as follows: manufacturers who categorize items by the type of items (candlesticks, lamps, shoes, etc.) or anything they sell would represent the predetermined list. If a manufacturer categorizes items by any other description these descriptors would consist of a predetermined category. As shown in FIG. 5 this exemplary manufacturer, e.g., Fine Art Lamps, organizes its products by "collection names" and therefore the collection names represent the predetermined categories.

Tags are the descriptors attached to each item individually. For example if a manufacturer is selling lamps and has lamps of all sizes, finishes and types these "tags or descriptors" would be attached to each item. The tags can be pre-entered into the database of the system by a spreadsheet (not shown). That spreadsheet can contain each "tag" that would be associated (attached) to an individual item. Using the spread sheet and the vendor/manufacturer as the example, a sales representative could type on the screen's keypad: "32", collection Bellagio" to enter that information into the system, whereupon the system responds by presenting on the iPad screen all of the lamps that are in the Bellagio Collection and are 32 inches tall. The ability of the system to make use of tags allows the sales representative to custom make a sales presentation for each specific client.

Figure 6:
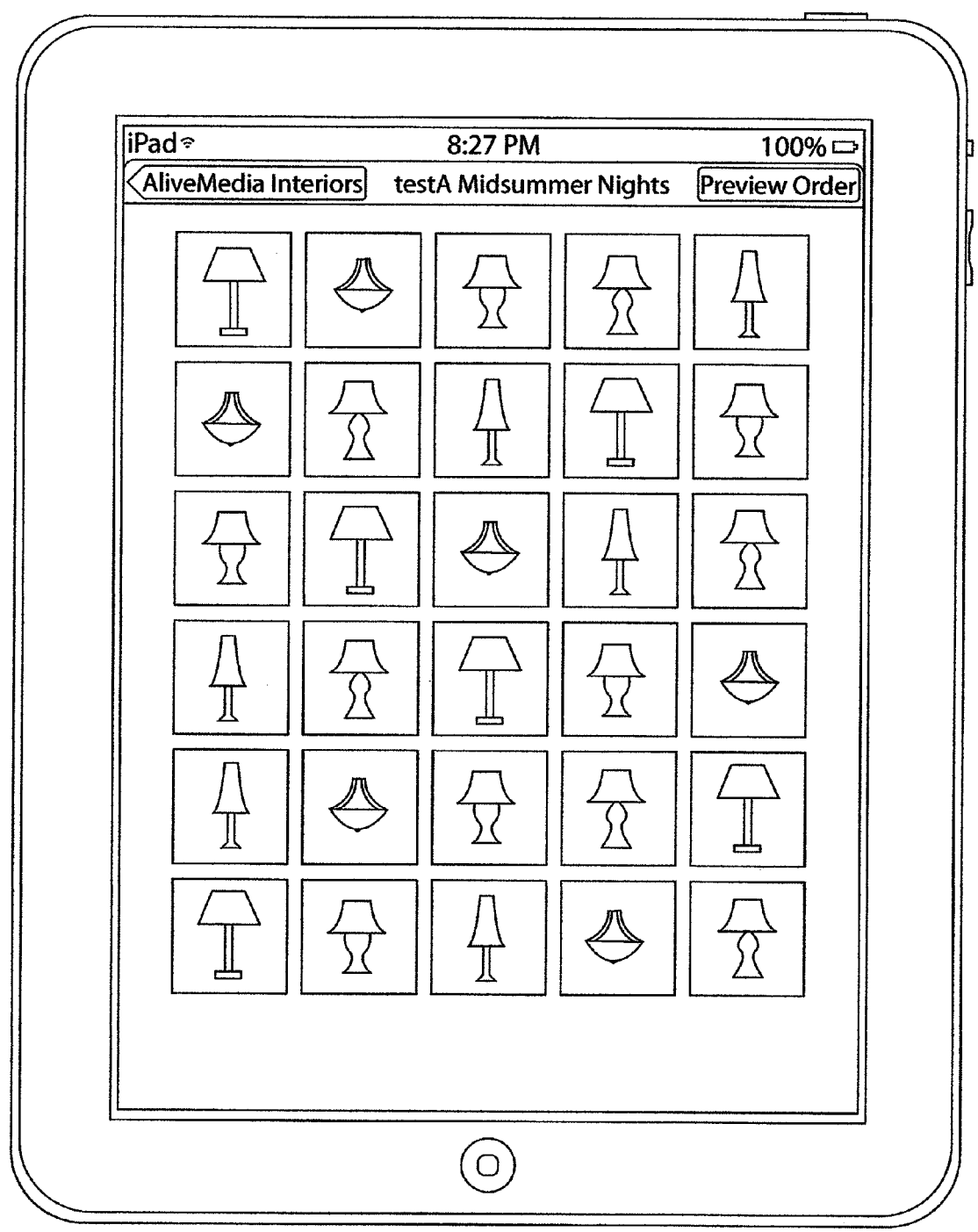
Figure 7:
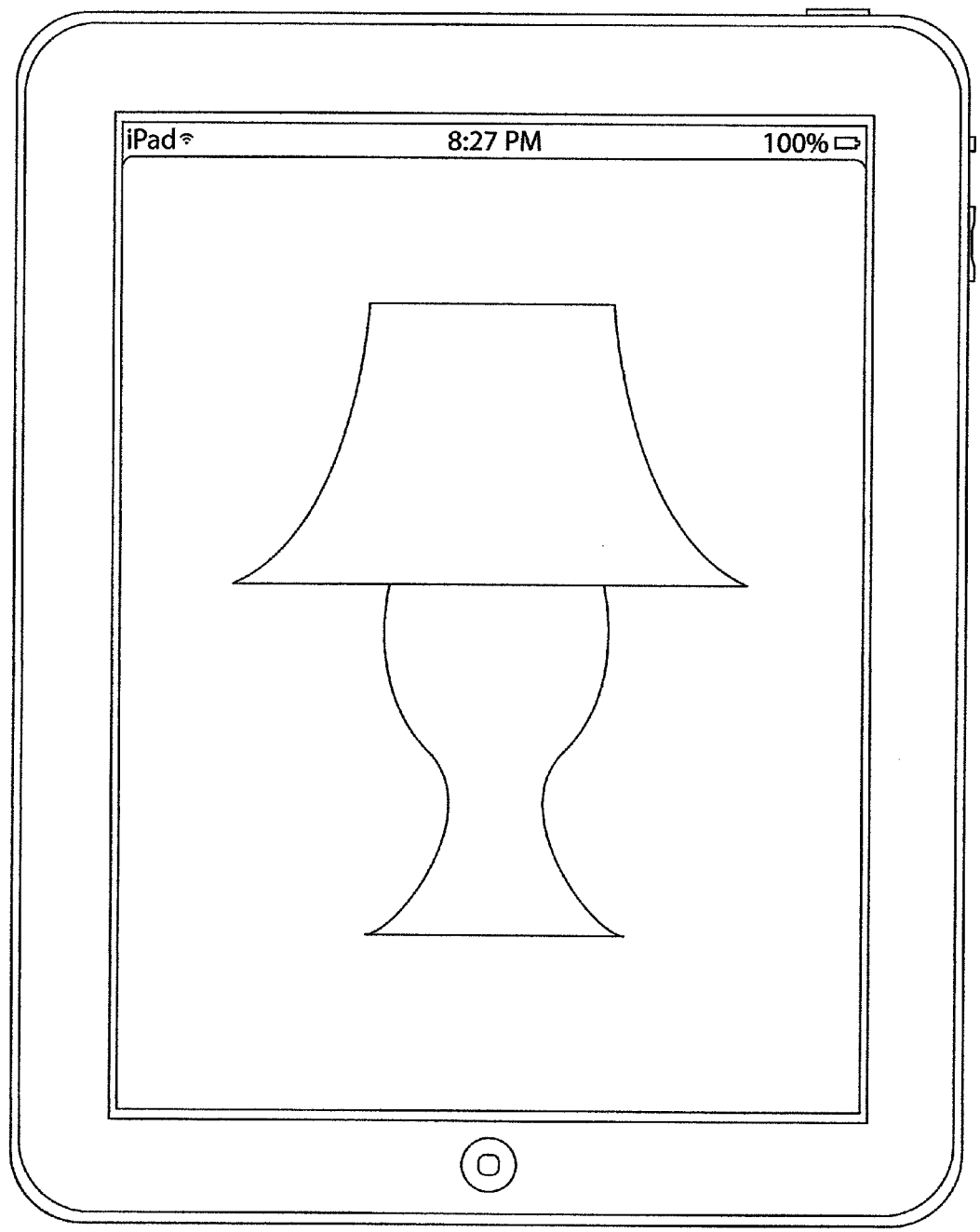

Whether the sales representative is using a presentation customized by the use of tags or is using the predetermined categories, or reviewing bookmarks, the sales representative has a collection of items that can be displayed one-by-one, or as thumbnails (as shown in FIG. 6). If the sales representative is showing the item one by one (such as shown in FIG. 7) he/she has a few display options to show the item. In particular, with an iPad as the display device 22, the representative can sweep the screen to the right or left and move to either the next item photograph (by sweeping to the left) or the previous item photograph (by sweeping to the right). By sweeping up on the screen all of the items will be displayed as thumbnails as shown in FIG. 6.

Figure 8:
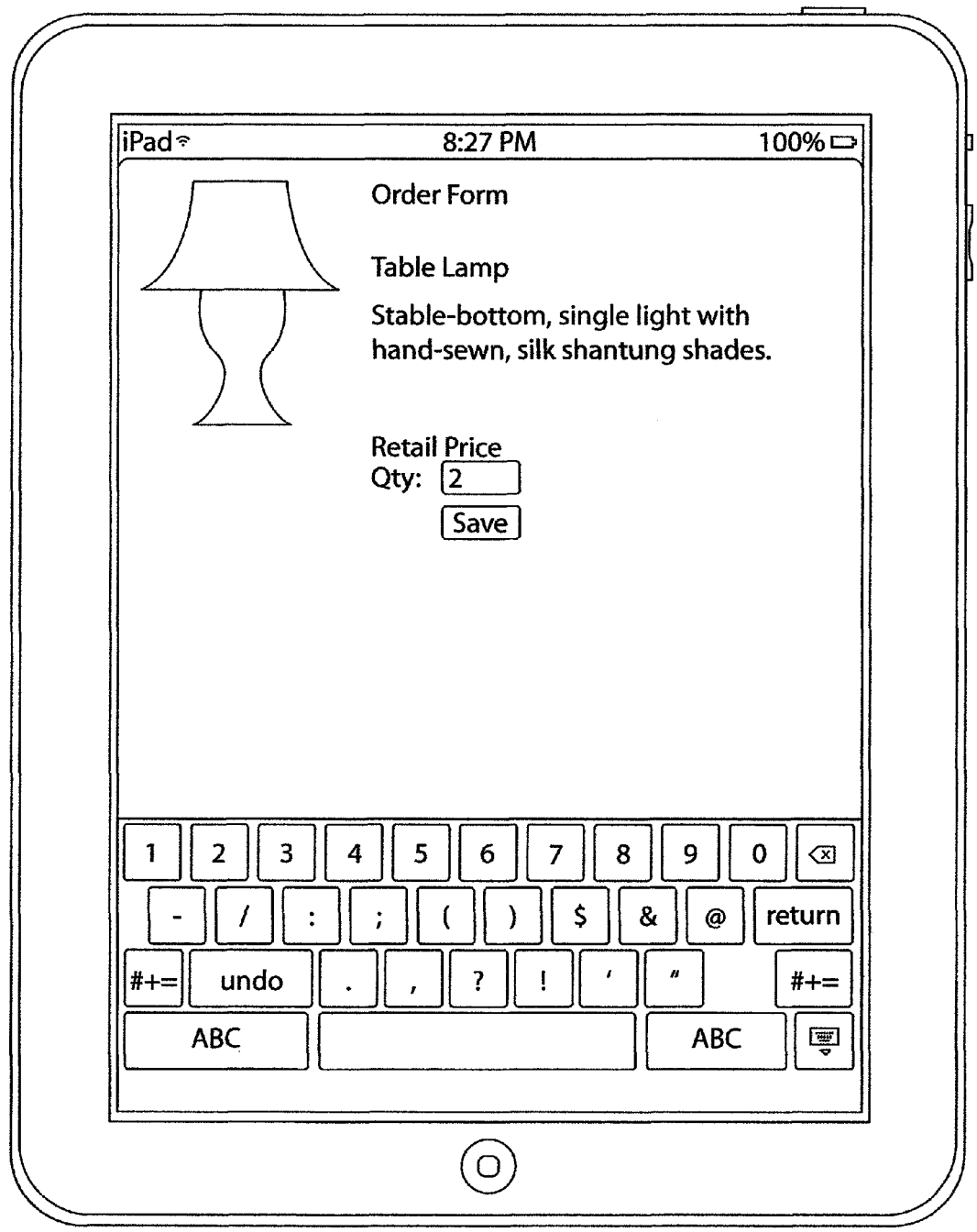
Figure 9:
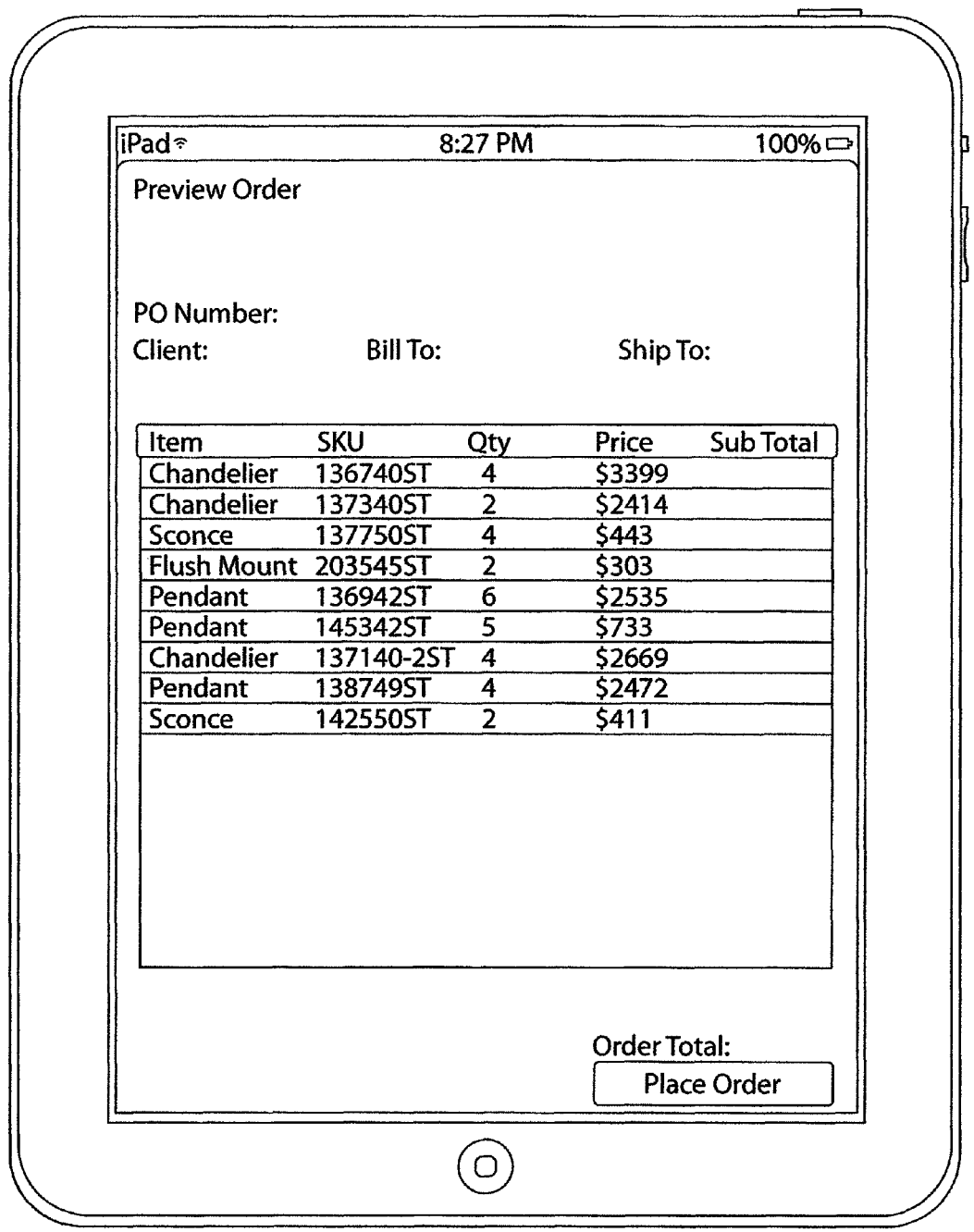

If the sales representative taps once on the item's image on the screen the representative will be given the option to add the item to an order. If the representative taps and holds the image he/she can email the image to the client (so that the client can have a copy for its records), to save the image. To order an item, the user goes to the Order Form screen as shown in FIG. 8. That screen can be filled in with the desired quantity by typing in that quantity number via the iPad's pop-up touch screen keypad. The representative can go back to the presentation to view other items for possible ordering by the client. If the sales representative taps twice on an item's image on the screen the screen shows a preview of the order on the Preview Order screen as shown in FIG. 9. When it is desired to submit the order, all that the representative has to do is to tap on the "place Order" button or tab in the lower right corner of the Preview Order screen.

Figure 10:
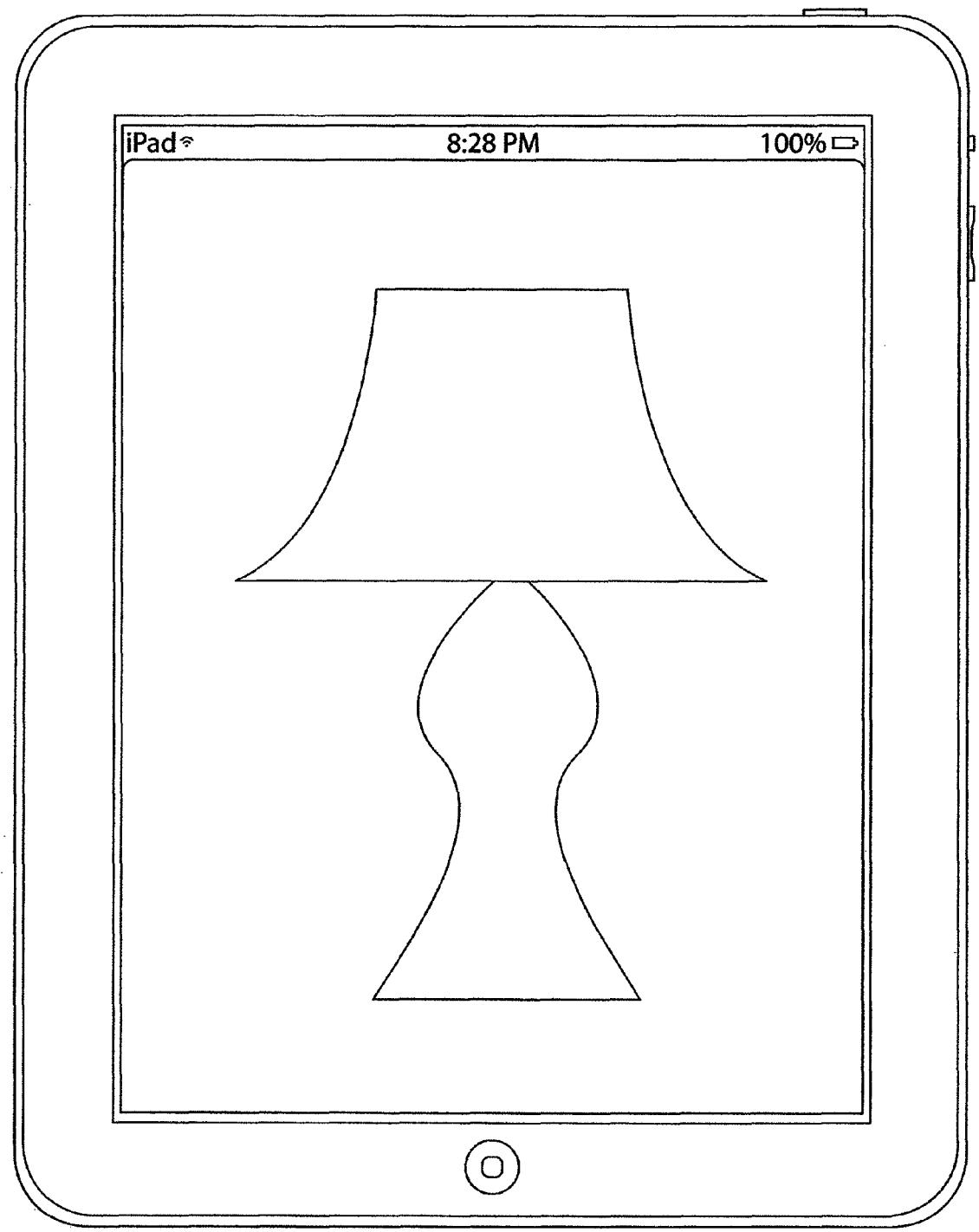
Figure 11:
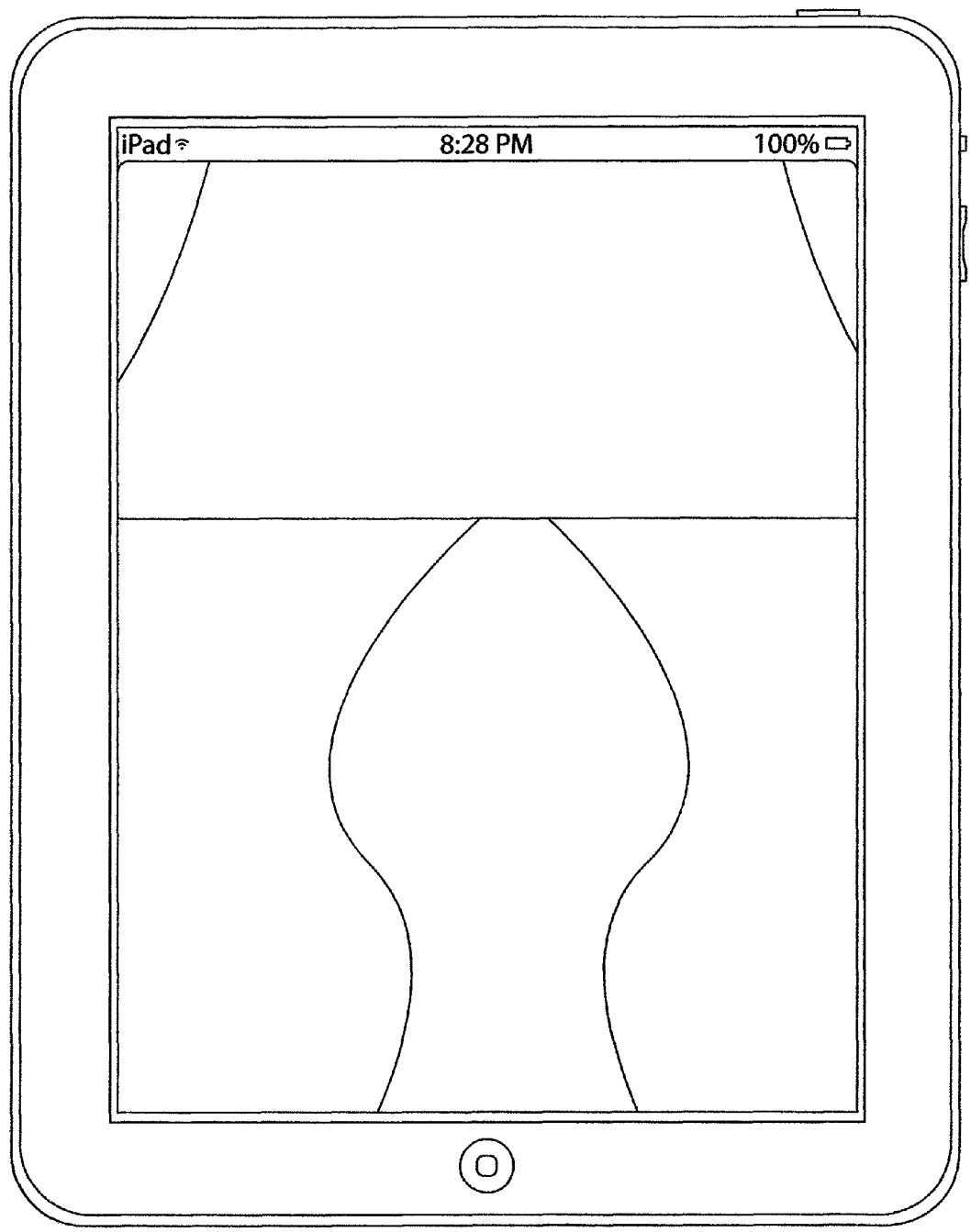

In FIG. 10 there is shown another exemplary lighting product which can be ordered. If the client wishes to have a closer view of any portion of that product (such as shown in FIG. 11), it can be accomplished by using the iPad's zoom feature.

Figure 12:
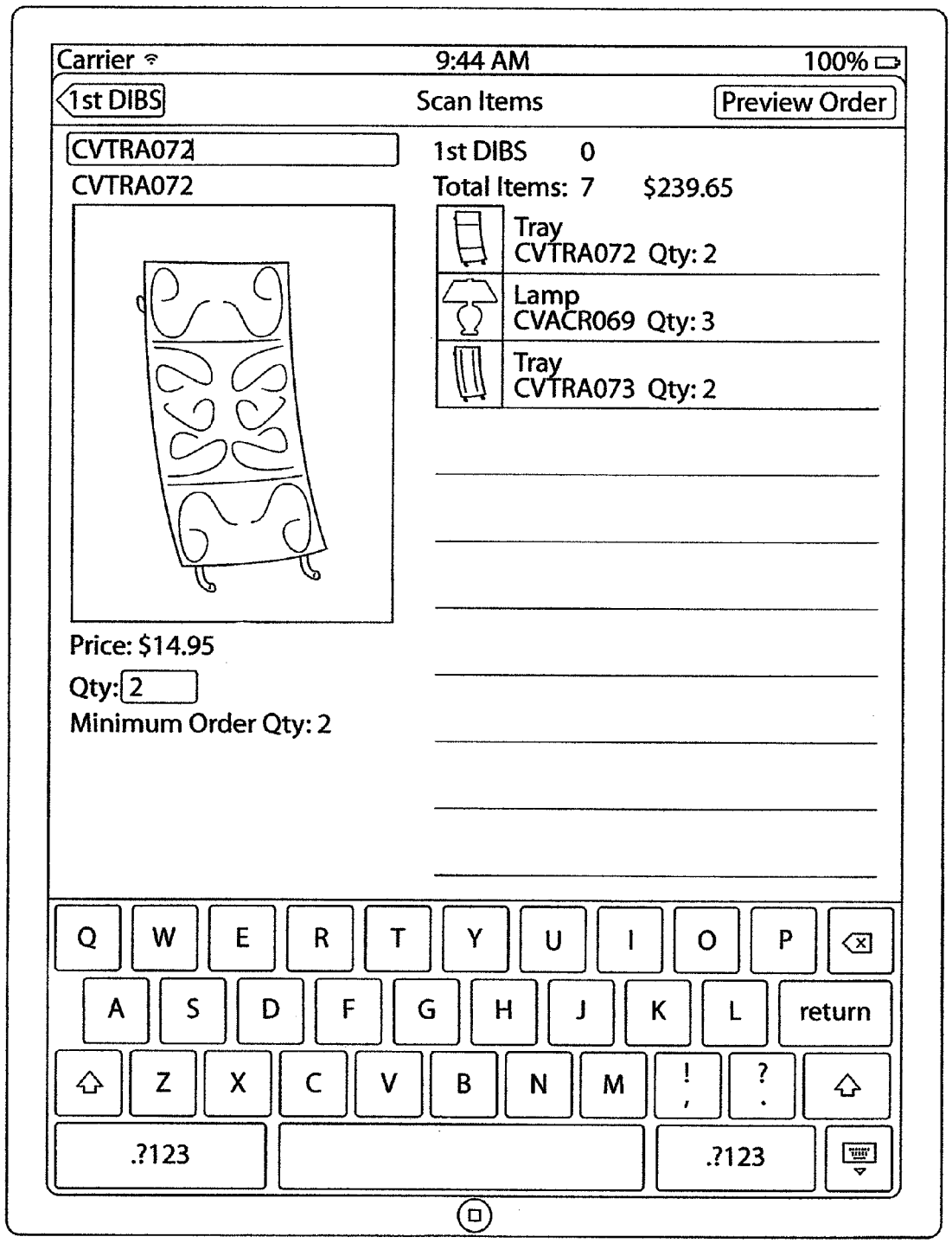

As can be seen in FIG. 1, the system 20 also includes a wireless (e.g., Bluetooth) barcode reader 28. Once the barcode reader is synched with the iPad, tablet, netbook or webbook, the sales representative (user) can simply scan an item's barcode and have that item added directly to an order. The interface for this function can be seen in FIG. 12. As can be seen the barcode number (in this example "CVTRA072") is displayed in the upper left corner of the screen when the barcode is scanned by the barcode scanner 28 and the actual image of that product is also displayed. In addition, a running total of all of the items in the order is displayed as can be seen in the right column of that screen. Thus, when a sales representative scans a barcode the item will show up in the system (e.g., in its database). From there the sales representative can select the quantity he/she wish to order. For this application, the barcode reader 28 replaces the actual sweeping and tapping of a photograph in a presentation. With this two-way data entry system (tapping the screen and using the barcode scanner) the subject invention can be used in a wholesale showroom by "zapping" barcodes, as well as on the road in person-to-person on-site meetings.

Each client of the service provider, e.g., RepZio, can also be part of social networking sites, such as Twitter and Facebook. As orders are placed via the iPad the buyer has the option to broadcast the new items via such social media. This way, when an interior designer, for example, wants to be a user of the service provider's (e.g., RepZio's) system he/she can put together a custom presentation for his/her clients utilizing the service provider's database and thus have a professional web presence to attract clients.

Figure 13:
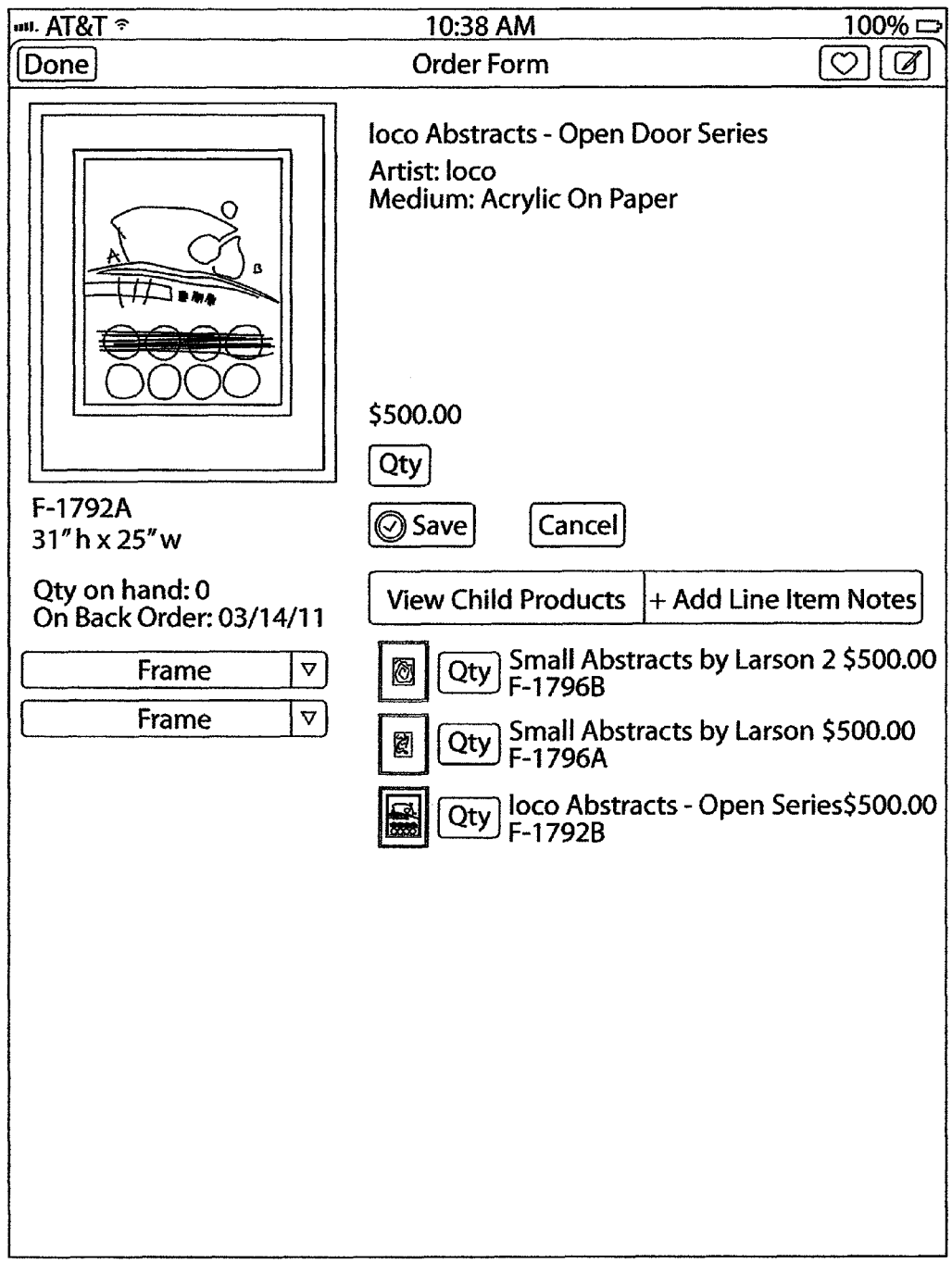
Figure 14:
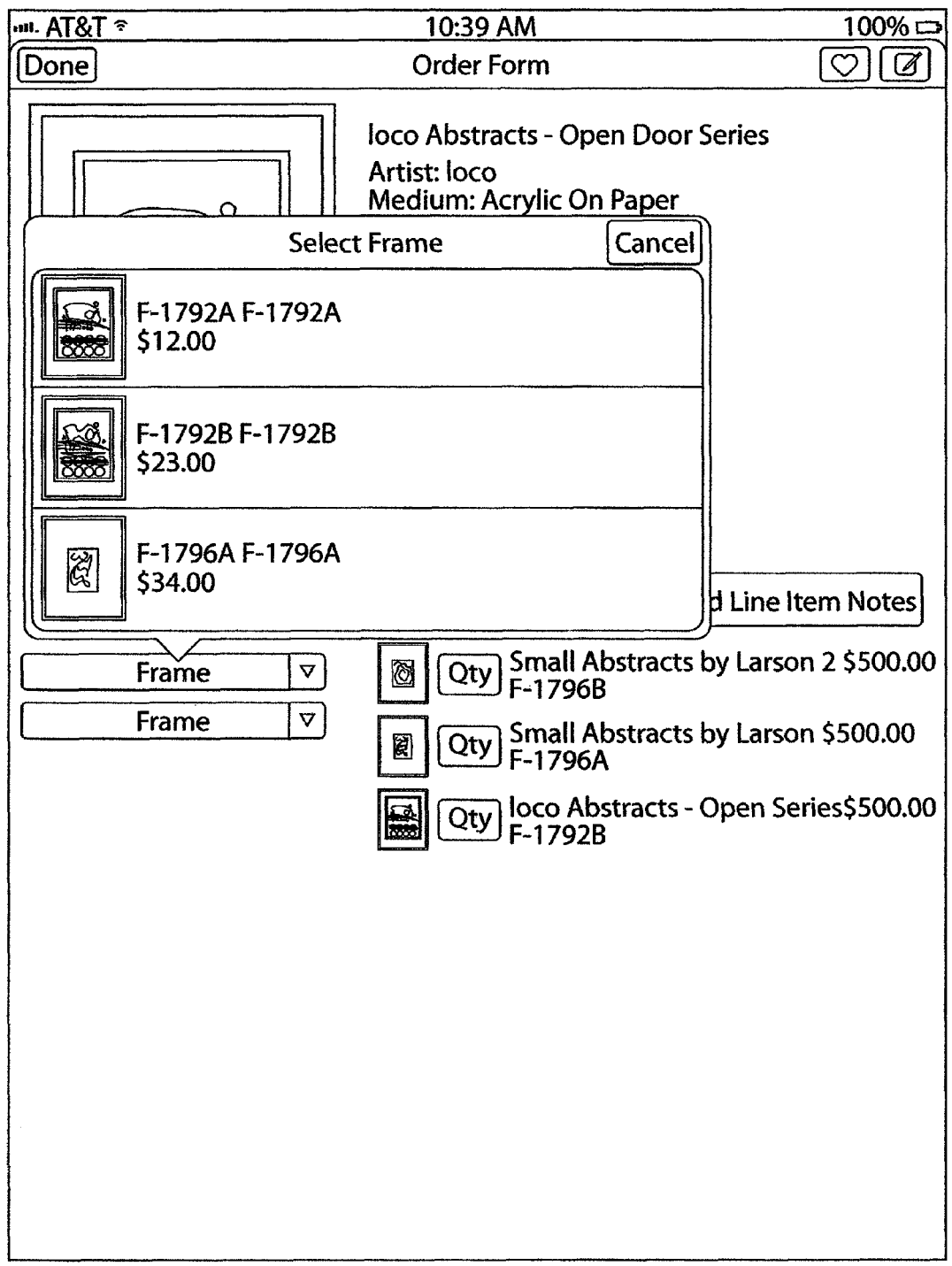
Figure 15:
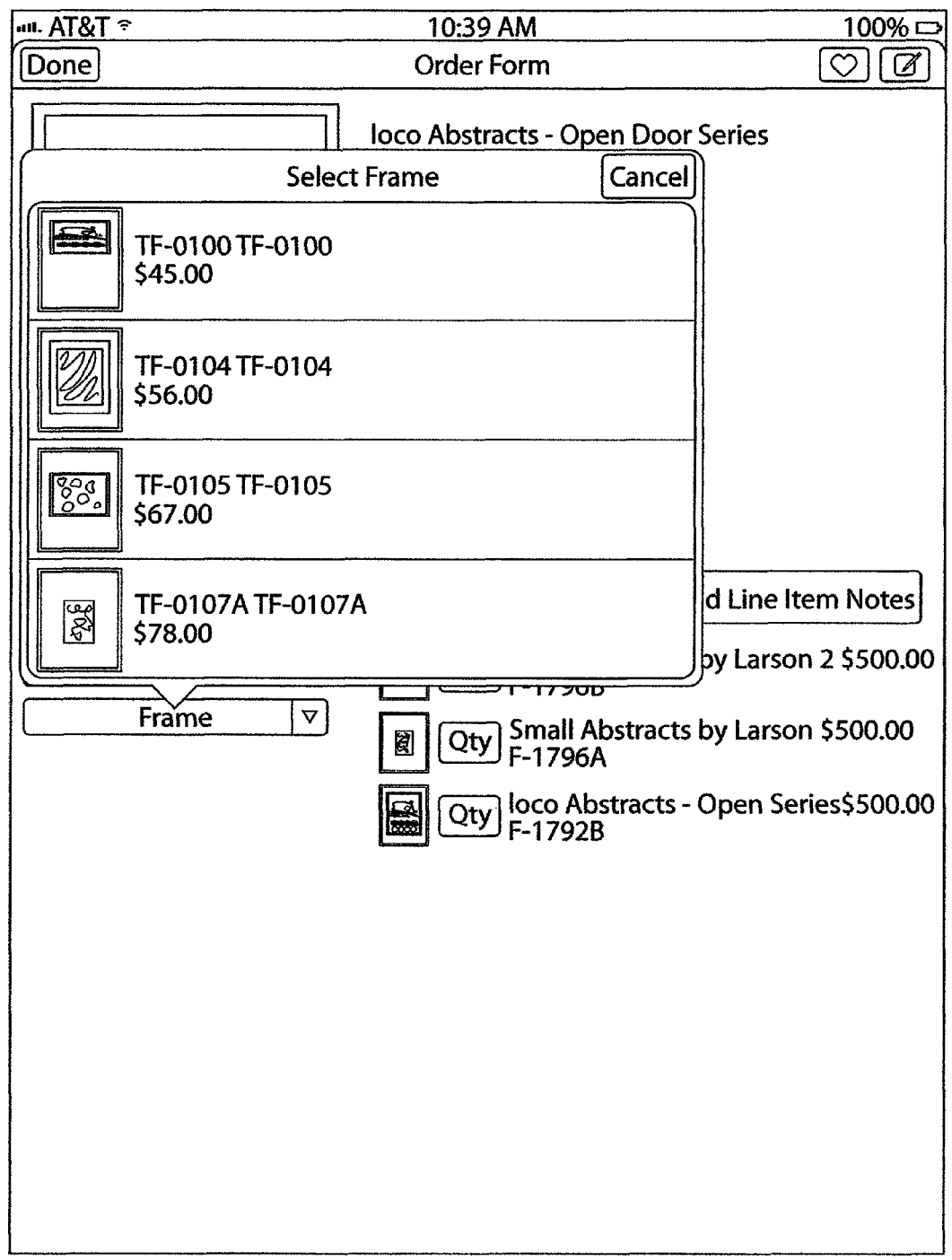
Figure 16:

The system 20 of this invention also has the ability to custom "configure" products through a series of drop-down menus as shown in FIGS. 13-16. This configuration ability allows a buyer to completely design and order products. FIG. 13 shows some exemplary configuration drop-down options (in this case, two potential frames for artwork). These options can be customized to fit the products sold. FIG. 14 shows the first of these product options expanded (e.g., plural frames for artwork are displayed). With the system of this invention one can have an unlimited amount of modifiers and an unlimited amount of options under each modifier. For example, in this example there are two modifiers, i.e., artwork frames, shown in FIG. 14. By selecting one of these two modifiers, i.e., by tapping on it, its various options are shown. Thus, as can be seen by tapping on the upper "frame" modifier in FIG. 14 three frame options are shown in a pop-up window. Tapping on the lower of the two modifiers, such as shown in FIG. 15, causes a pop-up window to appear displaying four frame options. FIG. 16 shows a preview of an order with two modifier options and their price.

Figure 17:
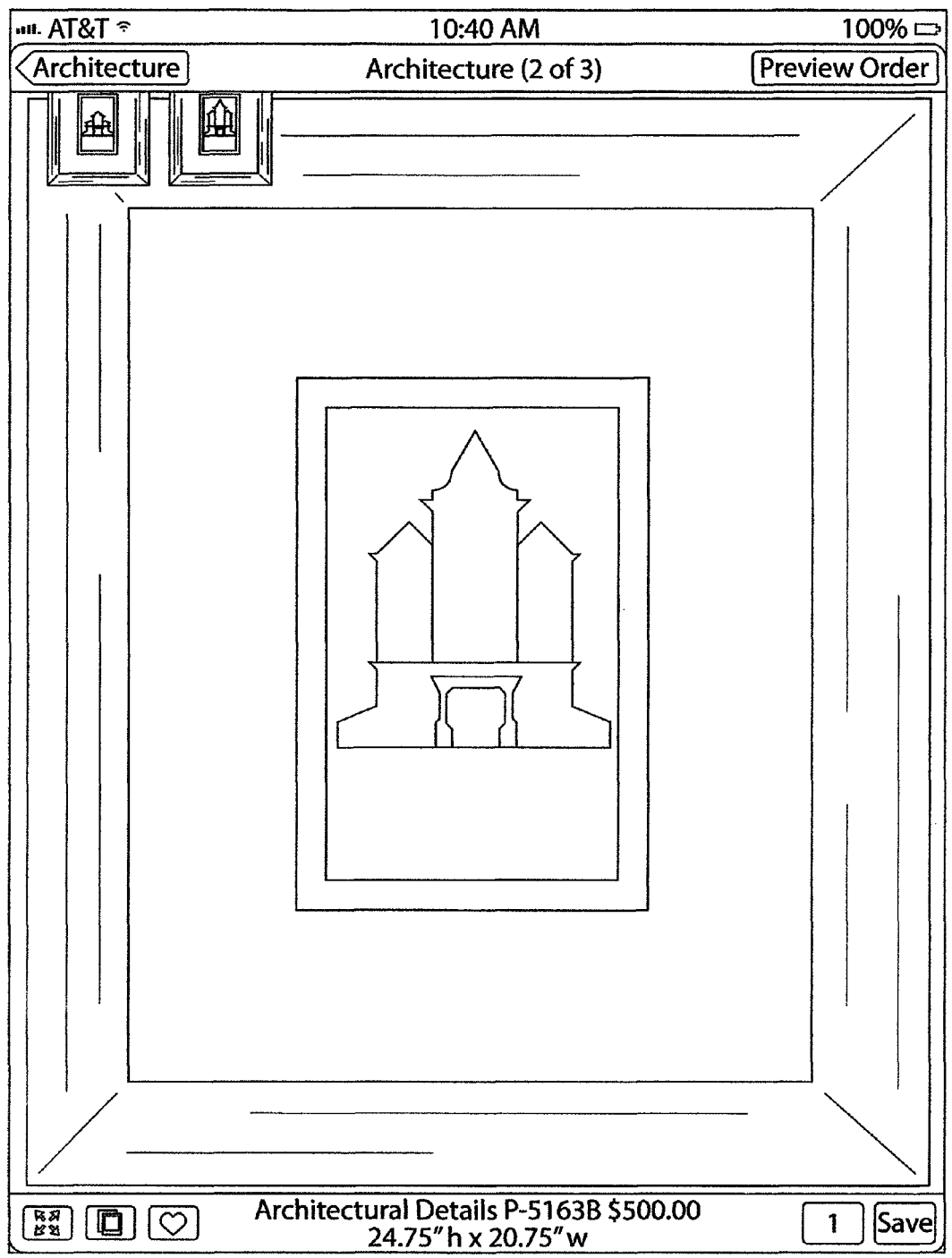
Figure 26:
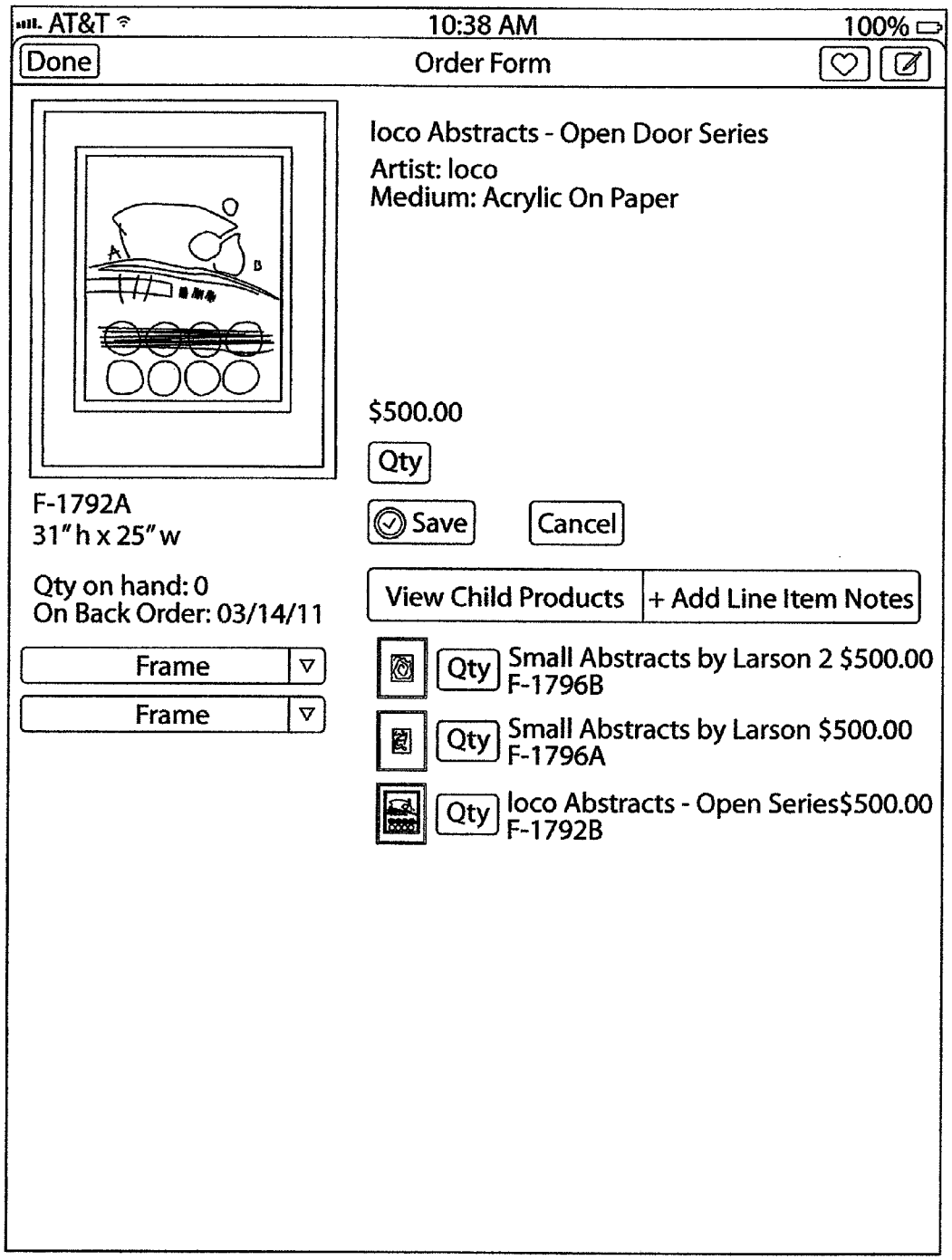

The system of this invention has the ability to show "related products" on the same screen as a product. For example, FIG. 17 shows two very important aspects of the related products feature of this invention. In particular, as can be seen in the lower left corner of that figure there is a small tab bearing four diverging arrows. This tab serves as an indicator that there are "related" products to the product being viewed. Thus, not only is the main product displayed, but also small icons of related products can also be displayed by tapping on the "related item" tab. For example, as shown in FIG. 17, two related products are displayed in the upper left hand corner of the screen upon tapping of the "related products" tab. This feature allows the user to toggle between related products without losing his/her place in his/her sales presentation. Additionally, a user can order "related products" via the "parent/child" option as shown in FIG. 26. In particular that figure shows a parent item with the "children" items listed below it.

Figure 18:
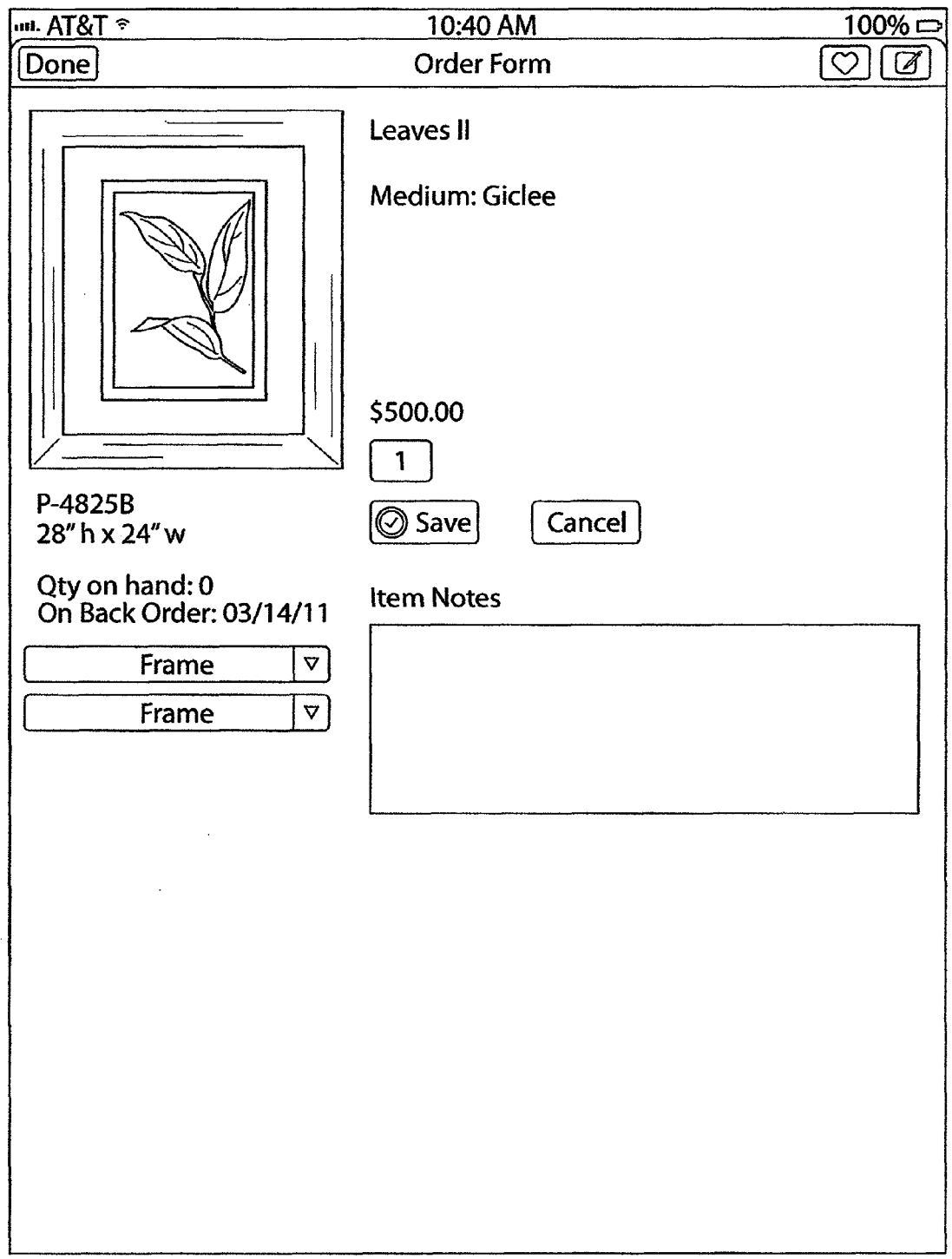
Figure 19:
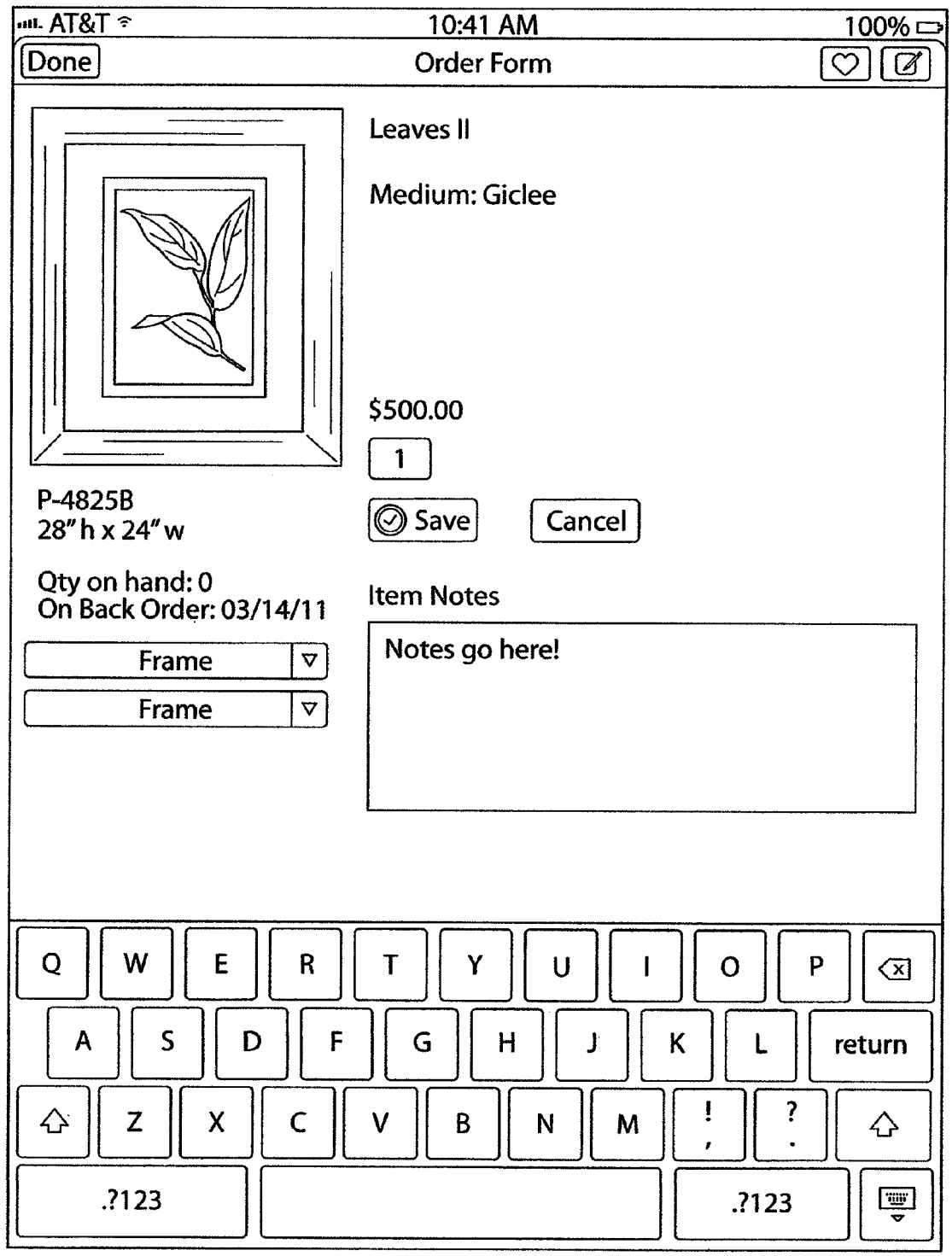
Figure 20:
Figure 21:

A user can also add "line item" and "whole order" notes to each order. FIG. 18 shows a blank area where the user can input the line item notes via the pop-up keyboard of the iPad. In particular, once the iPad is tapped the keyboard slides up (appears) from the bottom of its screen for quick input by the user. FIG. 19 shows information being input into the line item notes box. The text being entered in this example being the words "Notes go here!". FIG. 20 shows what the line item notes look like on the order preview page. FIG. 21 shows the input of "Whole Order" notes (in this case the words "Whole order notes go here!"). Line item notes are placed next to each item on the order form, whereas the whole order notes are placed at the bottom of the order.

Figure 22:
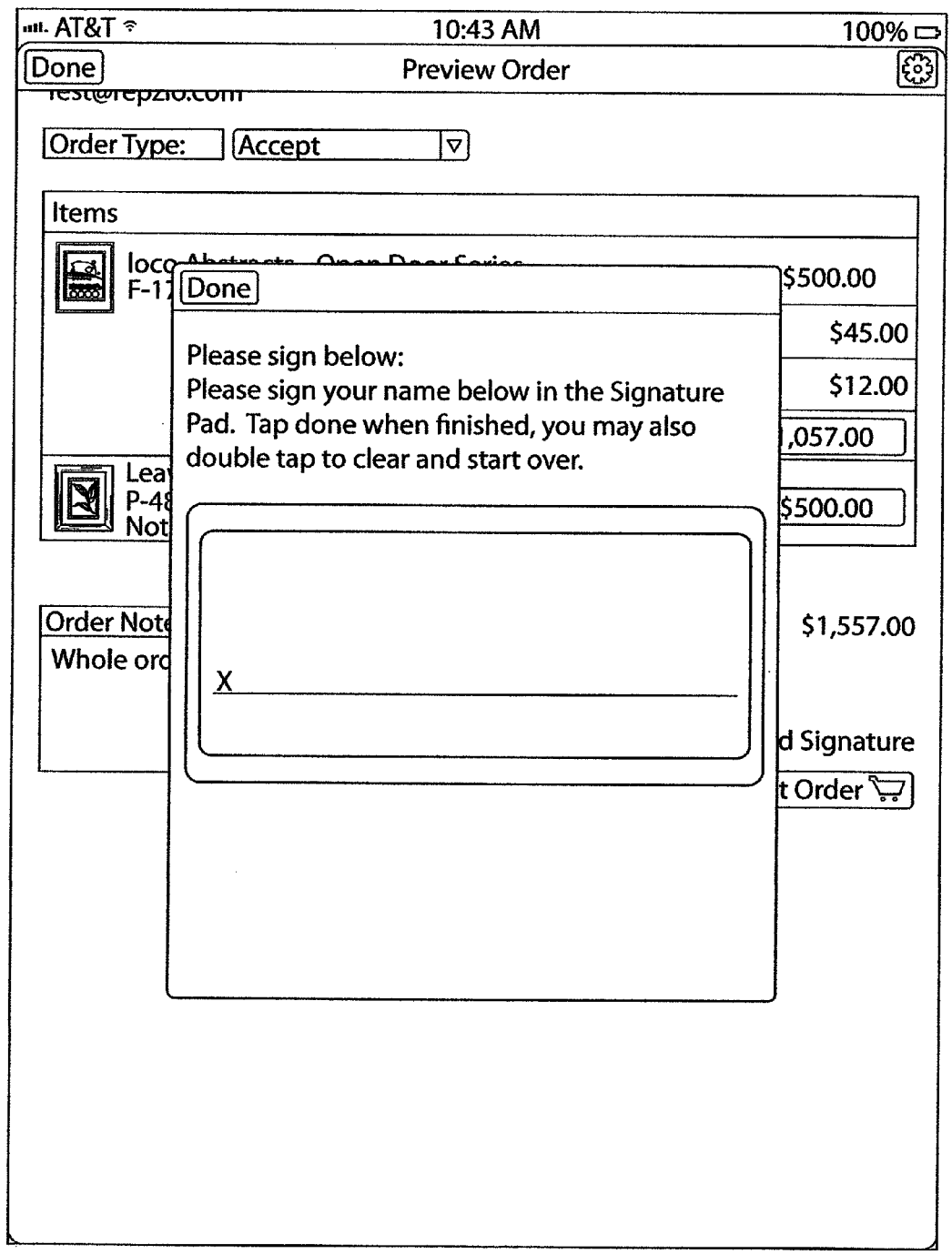
Figure 23:
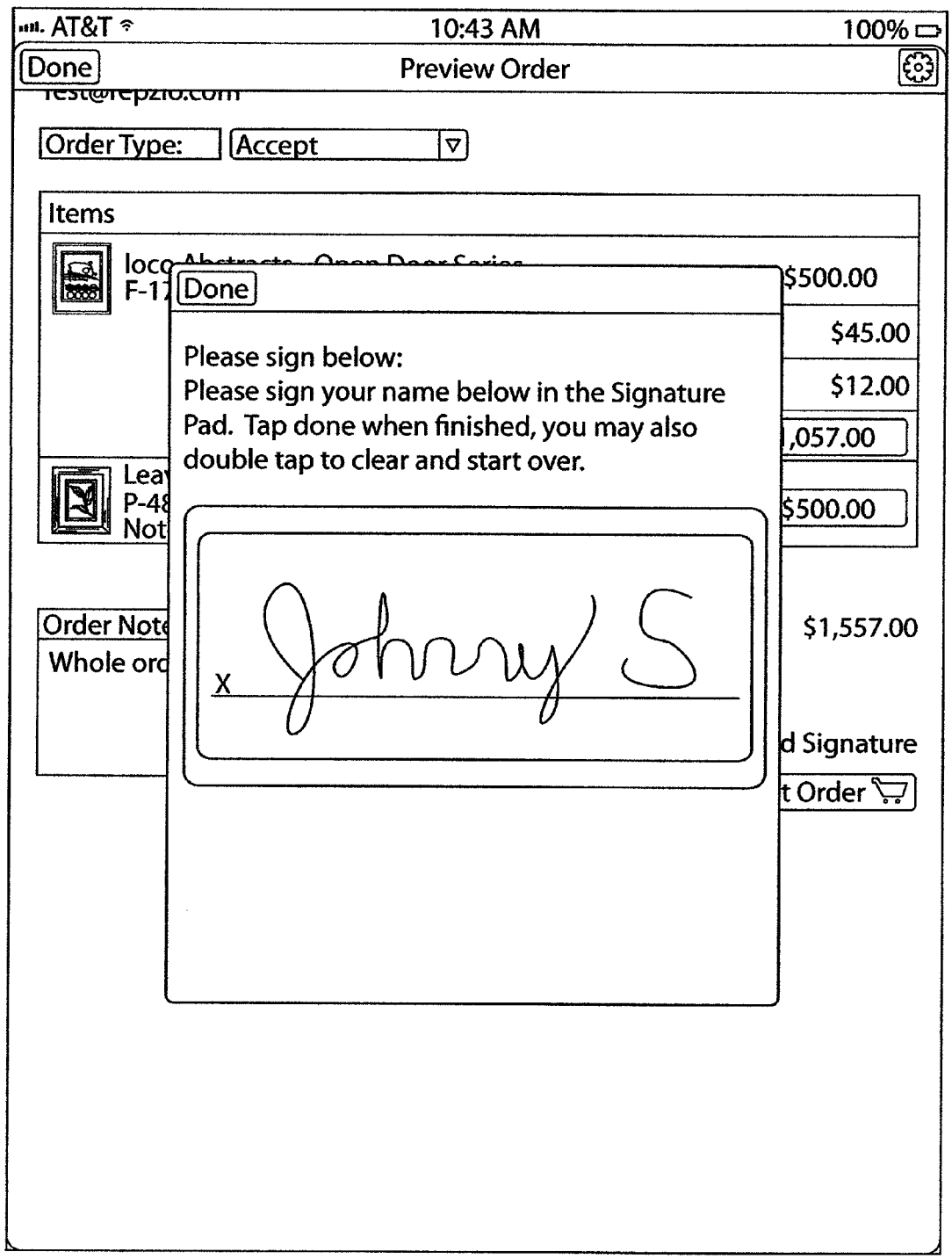
Figure 24:
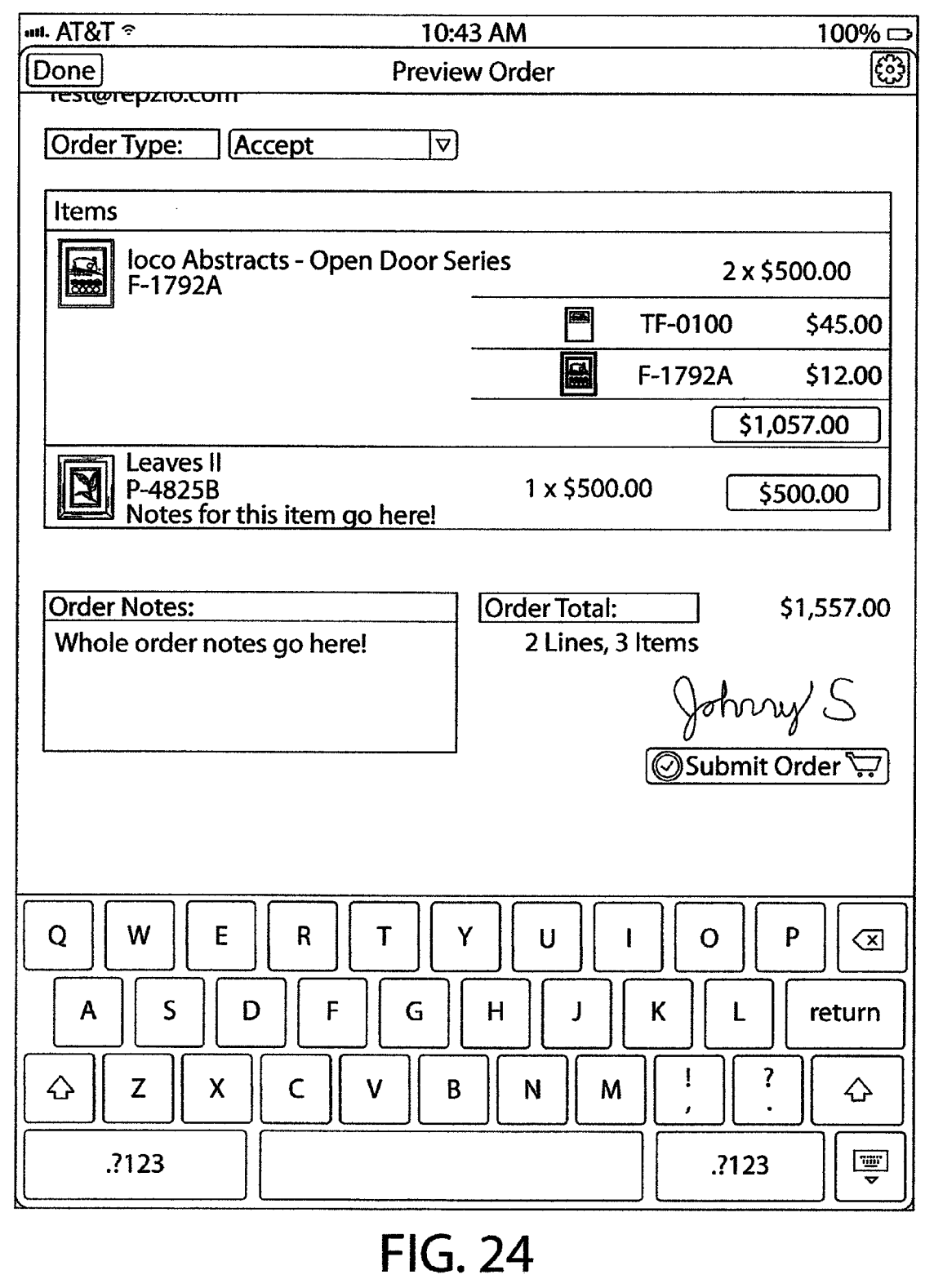

The system of this invention also has the ability to enable its users to sign and order with their fingers. For example, FIG. 22 shows the signature box having a signature line to be filled in by the purchaser of the product(s). FIG. 23 shows the signature of the purchaser which has been input by that purchaser moving his/her finger in contact with the iPad's touch screen above the signature line to create his/her signature. FIG. 24 shows how that signature lands on the order upon completion.

Figure 25:
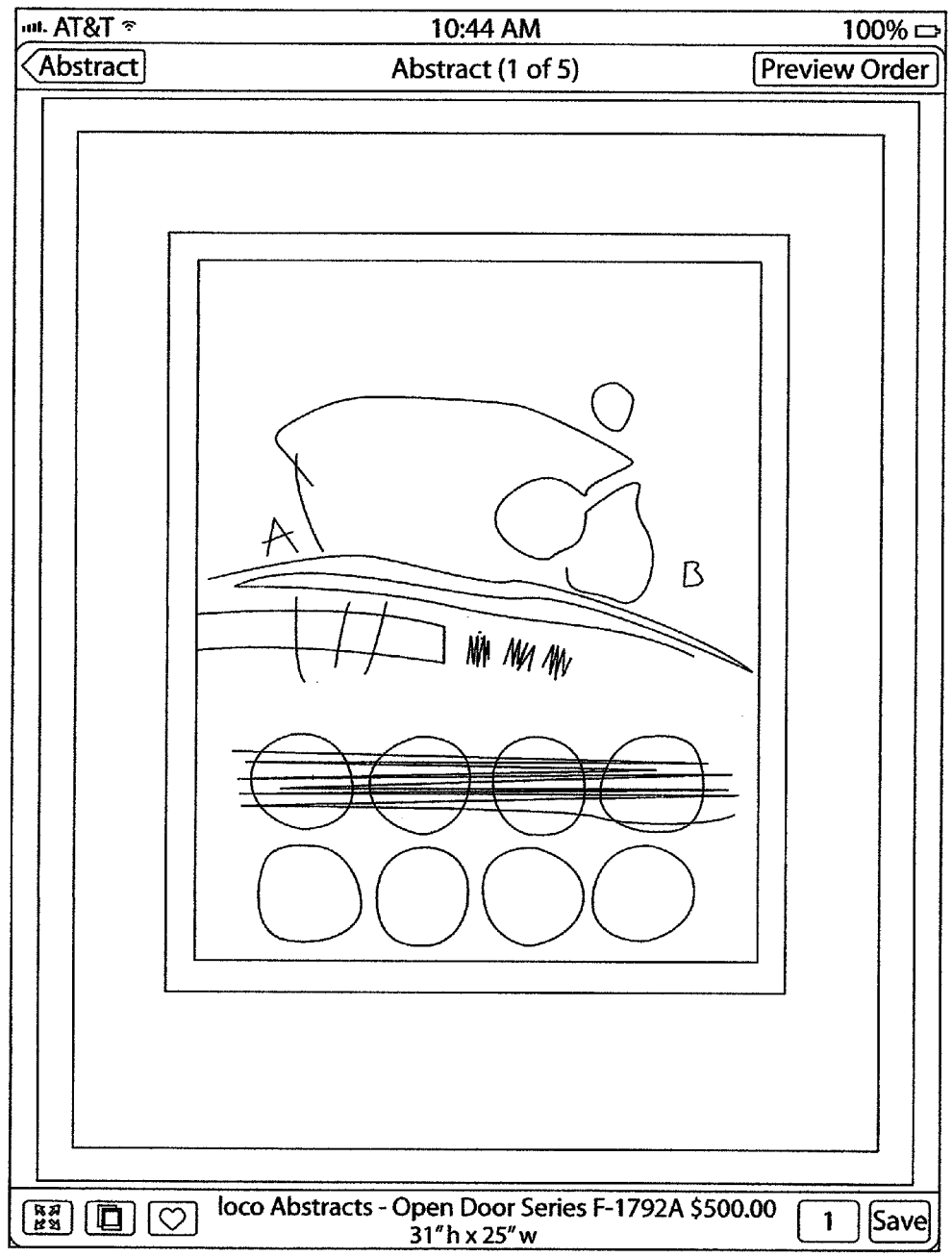
Figure 27:
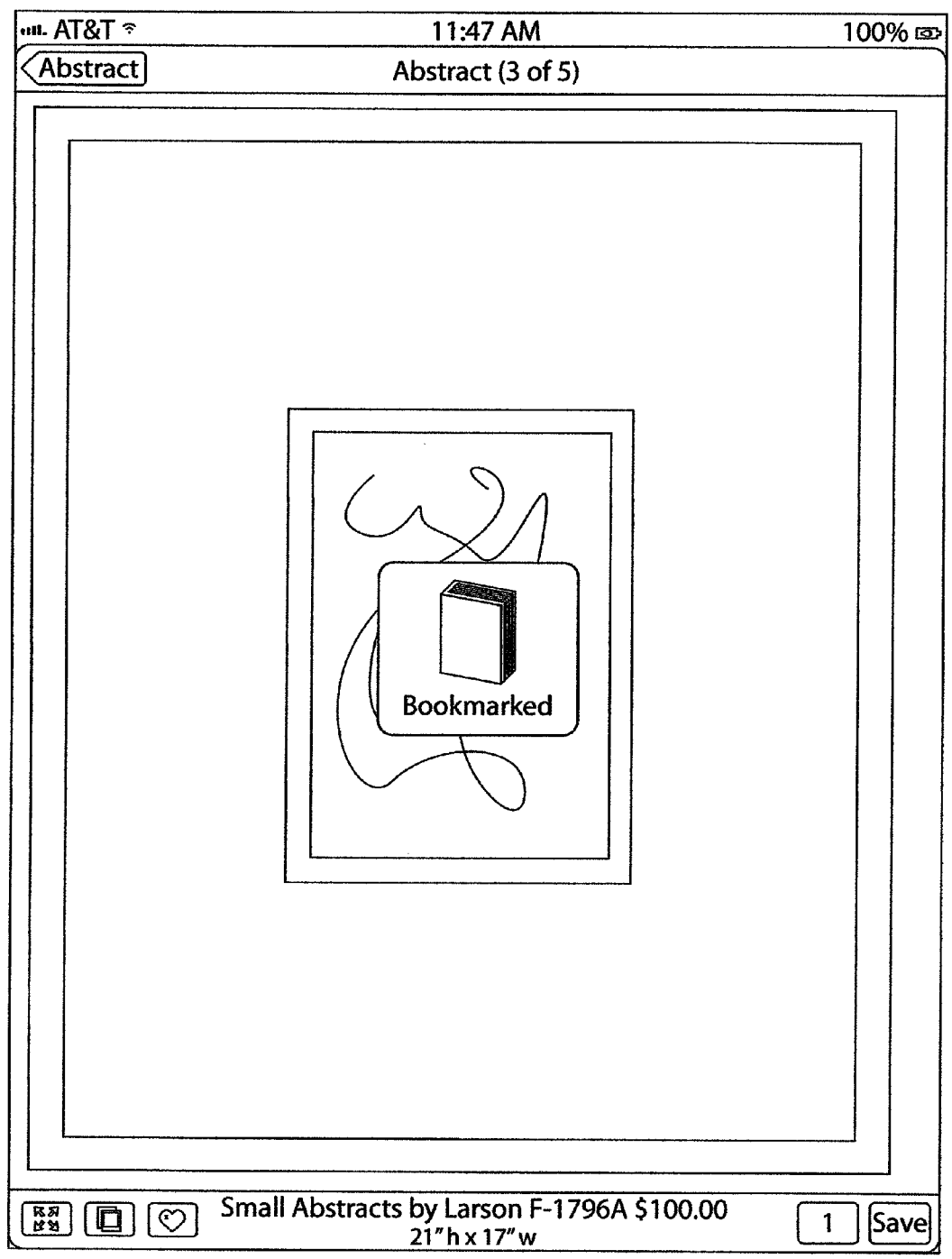
Figure 28:
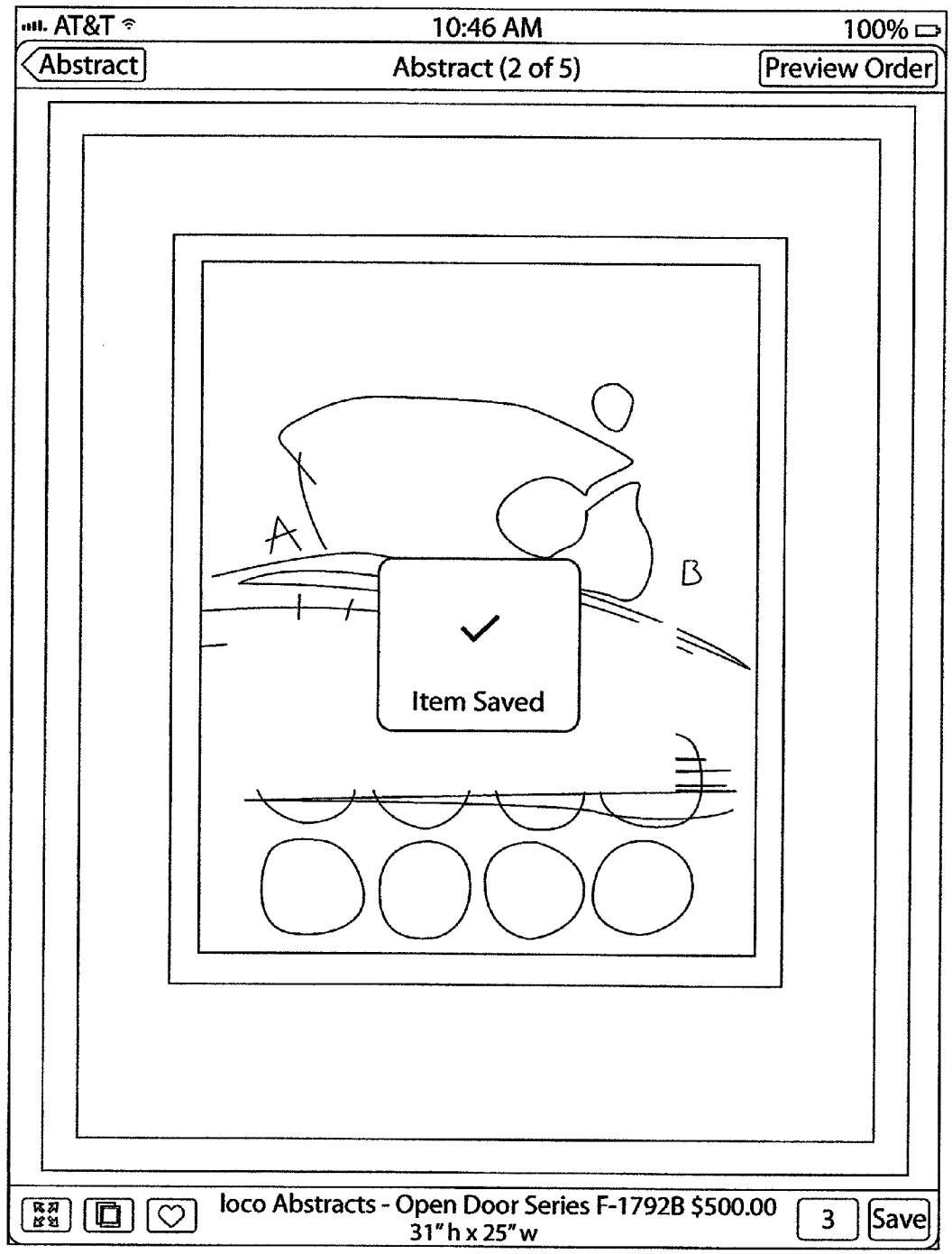

As mentioned earlier the system of this invention makes use of a "related products" tab. That tab is part of what are known as the "Quick Tabs" feature of the system. In particular, referring to FIG. 25, it can be seen that there are various "Quick tabs" appearing along the bottom of the screen of a products view page. For example, starting on the bottom on the left is the heretofore identified "Related Products" tab or indicator. This indicator appears as a white box when there are products related the particular product (large image) displayed. As discussed earlier when a user taps that "Related Products" tab, the related products appear as small icons across the top of the screen. Next to the related products tab is a "Multiple Images" tab. That tab enables the user to see multiple images of the selected product if such multiple images are available. If so, the "Multiple Images" tab appears as a white box. In the exemplary embodiment shown in FIG. 17 that tab is not white because there are no multiple images related to the particular product shown. If there were multiple images related to that product, and the user were to tap the Multiple Images tab, those multiple images would appear across the top of the screen, thereby allowing the user to toggle through them without losing his/her place in the presentation. Next to the Multiple Images tab is a "Bookmarks" tab. That tab is shaped like a heart and when tapped enables a user to select a product as a favorite. To that end, tapping this tab will automatically add the item in a "favorites" folder in the system. FIG. 27 shows an item that has been bookmarked (an "X" also will appear on the heart icon). To the right of the Bookmarks tab is a window which displays the number of items selected (in this case it is "1"). To the right of that window is the "Save" tab. Tapping on the save tab immediately adds the product to the order for that purchaser as shown in FIG. 28. The order can be previewed using the "Preview Order" tab appearing in the right upper corner of the screen. As should be appreciated by those skilled in the art the use of the Quick Tabs feature of this invention automates a number of the basic functions of the system.

Figure 29:
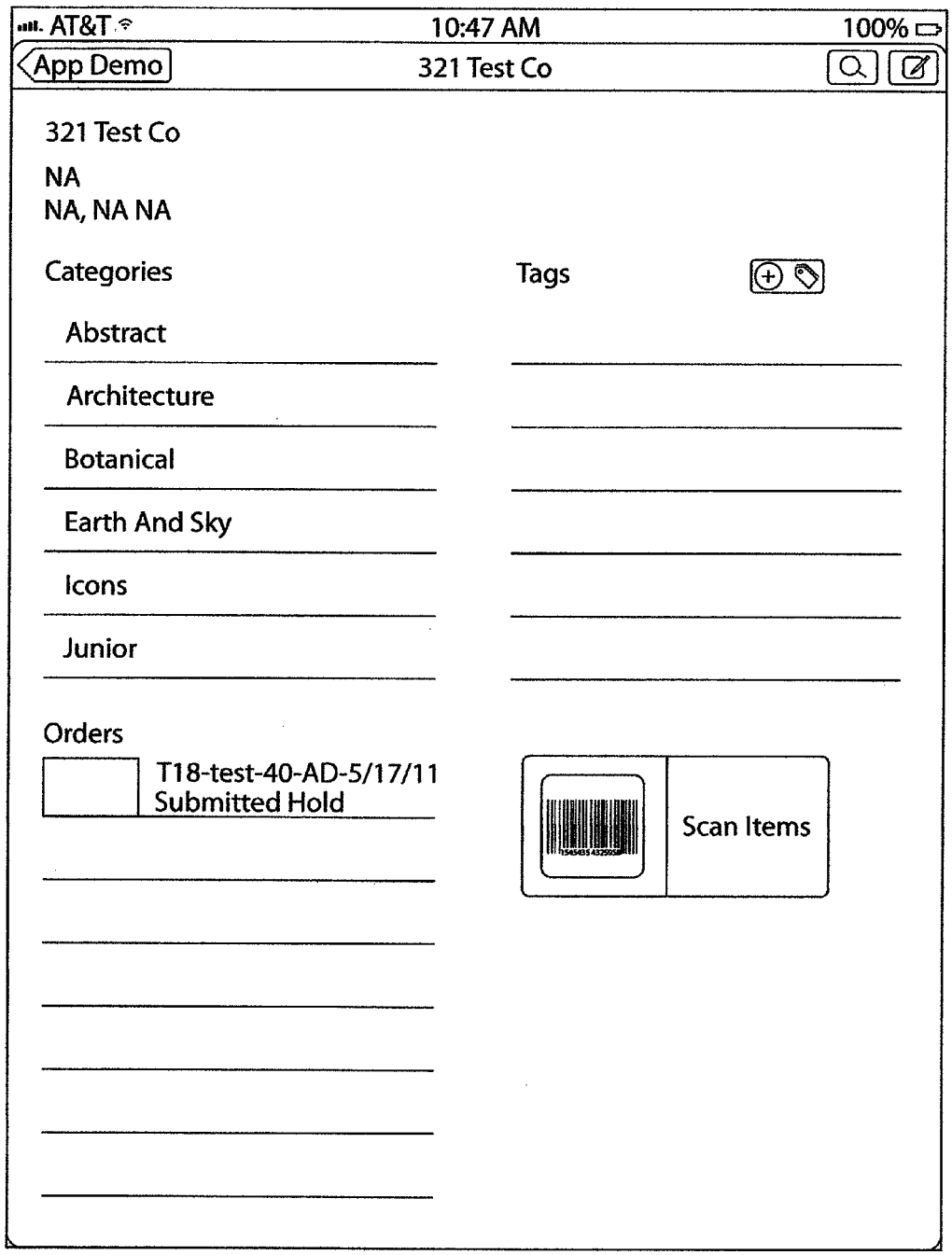
Figure 30:
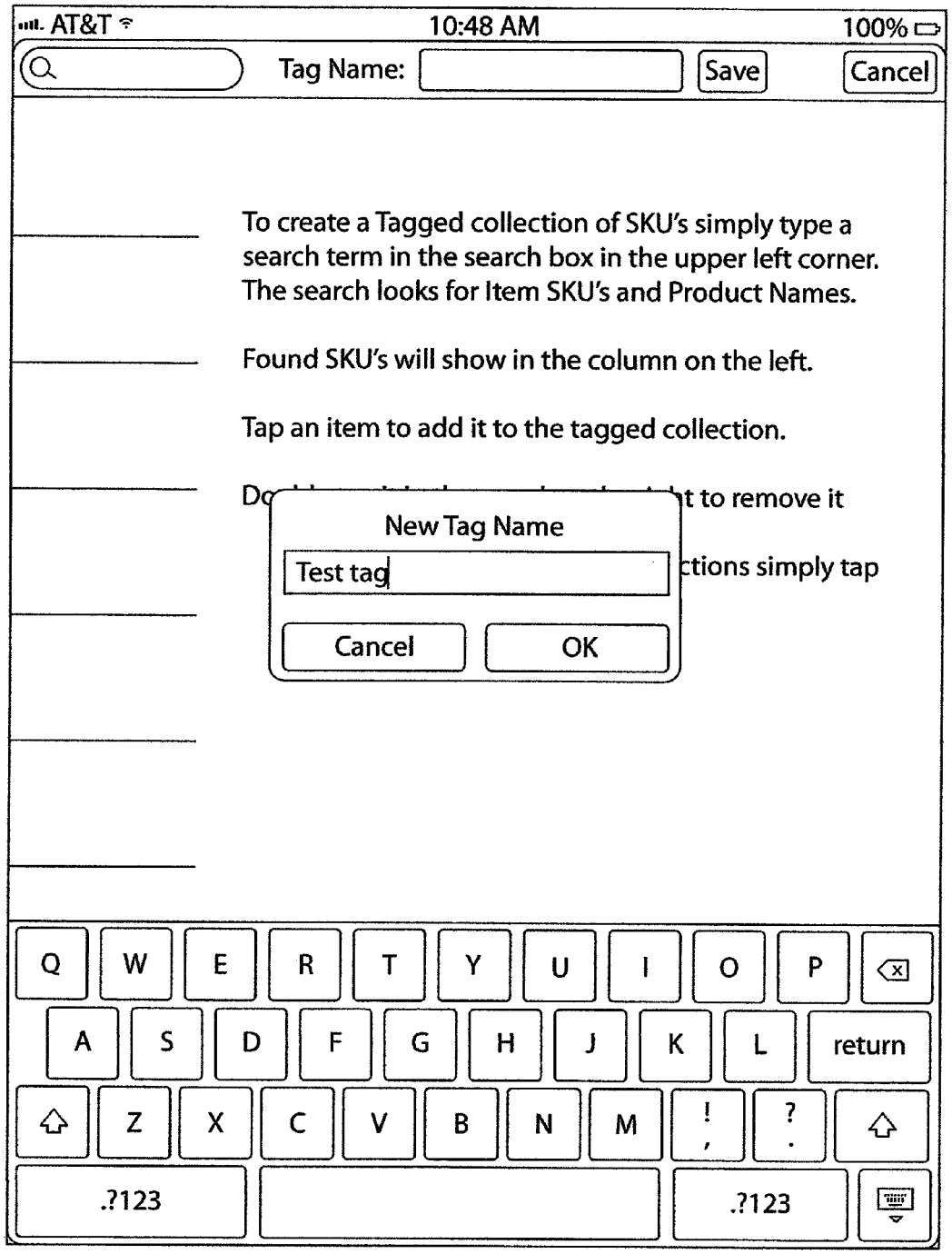
Figure 31:
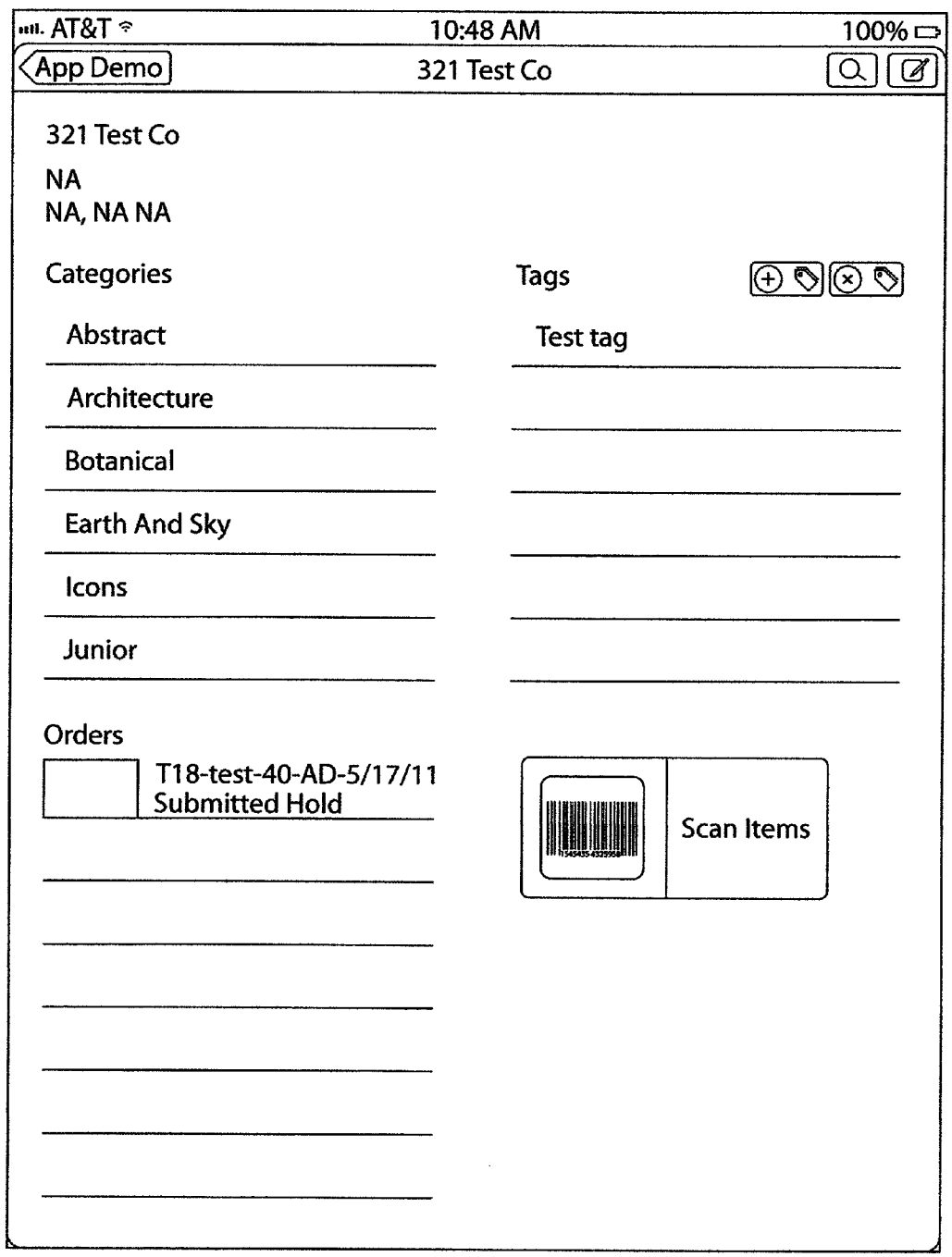

Another powerful feature of the system of this invention is the so-called "Tags" feature. With "tags" a user is able to put together a quick collection of products using "tags" and saving them. For example, FIG. 29 shows the tags column without any tags saved. FIG. 30 shows a new collection of "tags" being created. In this case the tag name is the words "test tag" and is input using the pop-up keyboard of the iPad. Finally, FIG. 31 shows the collection called "test tags" was created and saved.

Figure 32:
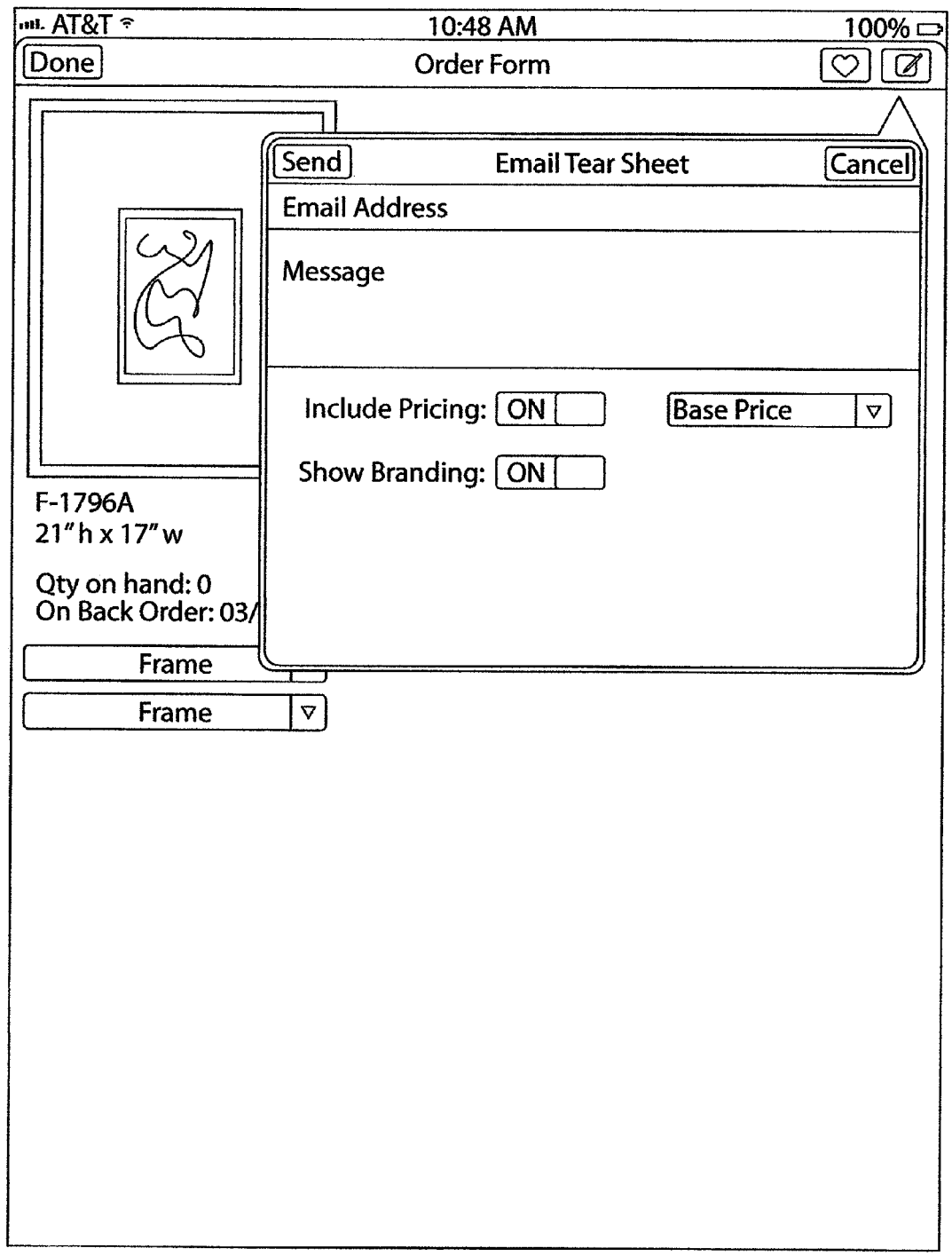

Another important feature of the system of this invention is the ability to email "tear sheets" and tags sets as shown in FIG. 32. This screen shows the interface to email both tear sheets and tag sets to a customer. Moreover, the system enables one to "copy" orders that have already placed by use of the iPad and then send copies of those orders to any client (customer). To that end, the order will be duplicated and put under the client that the user "copied" on the order. The user can choose to include in the tear sheets pricing information and branding information by toggling the respective on/off switches appearing in the Email Tear Sheet pop-up window.

Figure 33:
Figure 34:
Figure 35:
Figure 36:
Figure 37:
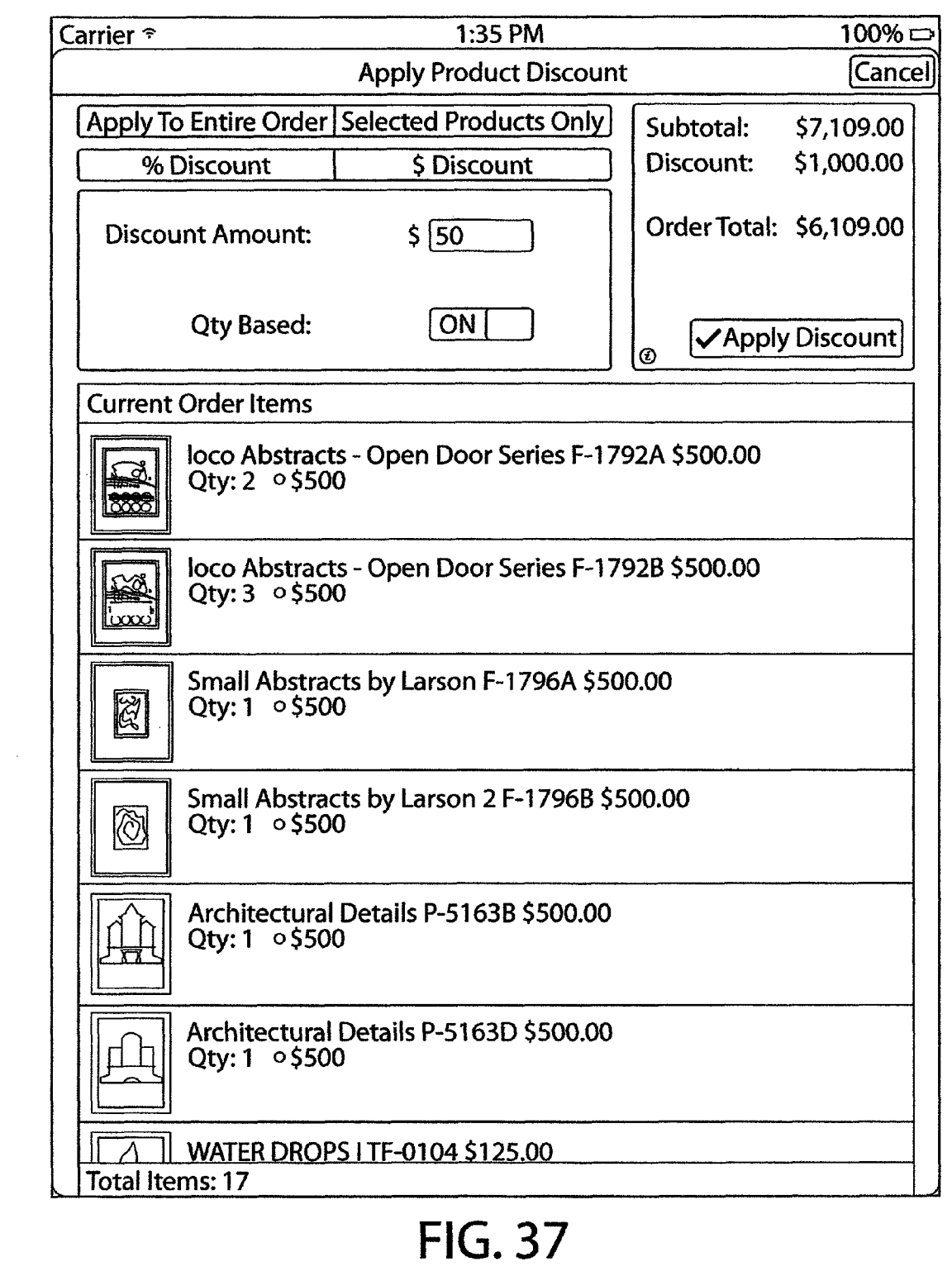

FIG. 33 shows various the things that a user can do with an order. In particular, he/she has the ability to edit the client and also add unlimited "ship-to addresses". The user can also edit the order (e.g., add or delete items), transfer the order to a different client (or buyer), and can add a product by a putting a unique item number and the price of the item into the system. Moreover, the user can also apply a discount to the order in four different ways as shown in FIGS. 34-37. In particular, the user has the ability to apply a dollar or % discount, to individual items or to the entire order. For example as shown in FIG. 35 the user can add a percentage discount to specific products in the order. FIG. 36 shows the percentage discount being applied to the entire order. Finally, the user can also apply a "quantity discount", which discounts either a specific dollar amount or %, to individual items. In FIG. 37 a $50 discount is automatically applied to each product in the order.

The system of this invention also has the ability to be "skin-able". Which means that each individual client has the ability to completely customize the appearance of the application. In particular, the system enables the adjustment of color, font, tab size and complete esthetics for a particular client's application. It also has the ability to use foreign currencies and symbols.

As should be appreciated by those skilled in the art the subject invention is a total automation of the wholesale sales process utilizing modern technology, e.g., wireless iPads, tablets, netbooks, webbooks and the like, to provide access via the Internet to a specific databases of products to enable sales representatives to readily place orders for various products for their clients.

Without further elaboration the foregoing will so fully illustrate our invention that others may, by applying current or future knowledge, adopt the same for use under various conditions of service.

We claim:

1. A method for selling wholesale products to a retail business, the method being for use by a sales representative representing at least one manufacturer or vendor of the products, the method comprising the steps of:

pre-loading a portable computing device having a display with a catalog of the products, said catalog including image and alphanumeric data, including price information about the products;

receiving a log in and password from said sales representative;

in response to receiving said log in and password, automatically:

retrieving a list of retailers who are clients of said sales representative, determining using a GPS tracking feature of said portable computing device that said sales representative is located at a retail business, and sorting said list of retailers and placing said retail business at the top of said list of retailers based on said determination;

receiving a selection of said retail business on said list of retailers from said sales representative;

presenting said catalog of products to the retail business by the sales representative;

examining said catalog of products by the retail business;

entering orders for a portion of the products onto said computing device;

transmitting said orders from said computing device to the manufacturer.

2. The method of claim 1 wherein said catalog is updated periodically onto the portable computing device from a server.

3. The method of claim 1 wherein said preloading is performed wirelessly via the Internet.

4. The method of claim 1 wherein said portable computing device comprises a tablet, netbook or portable computer.

5. The method of claim 1 further comprising scanning bar coded items to be added directly to an order.

6. The method of claim 1 further comprising
displaying a manufacturer or vendor that the sales representative represents upon receiving said log in and password.

7. The method of claim 6 further comprising
displaying open orders, parts orders or client notes upon receiving said log in and password.

8. The method of claim 1 further comprising
providing a copy of an order placed to a client via email from said portable computing device.

9. The method of claim 1 further comprising
previewing order data on the display before said entering of the order is made.

10. The method of claim 1 further comprising
displaying a running total of all products ordered on the display of said portable computing device.

11. The method of claim 1 further comprising
configuring products through a series of drop down menus appearing on the display.

12. The method of claim 1 further comprising
displaying related products to those for which said orders were entered.

13. The method of claim 1 further comprising
placing a particular product selected in a favorites group for a client.

14. The method of claim 1 further comprising
inputting discount data via the portable computing device by the sales representative to provide a selected type of discount to be applied to the order.

15. The method of claim 14 wherein said discount is either a specific monetary amount or a percentage.

* * * * *